United States Patent [19]

Hirayama et al.

[11] Patent Number: 5,025,331
[45] Date of Patent: Jun. 18, 1991

[54] TAPE CASETTE LOADING SYSTEM COMPATIBLE WITH TWO DIFFERENT SIZED CASSETTES

[75] Inventors: Hiromichi Hirayama, Yokosuka; Mitsuhiko Hara, Kawasaki; Masato Mihara, Hiratsuka; Mitsuo Harumatsu, Tokyo, all of Japan

[73] Assignee: Victor Company of Japan, Ltd., Kanagawa, Japan

[21] Appl. No.: 269,775

[22] Filed: Nov. 9, 1988

[30] Foreign Application Priority Data

Nov. 10, 1987 [JP] Japan .................. 62-282248

[51] Int. Cl.⁵ .................................... G11B 5/027
[52] U.S. Cl. ............................. 360/85; 360/94; 360/95
[58] Field of Search .......... 360/85, 94, 95, 130.21, 360/130.22

[56] References Cited

U.S. PATENT DOCUMENTS

| | | | |
|---|---|---|---|
| 4,797,760 | 1/1989 | Rademacher et al. | 360/85 X |
| 4,837,645 | 6/1989 | Miyamoto et al. | 360/95 X |

FOREIGN PATENT DOCUMENTS

| | | | |
|---|---|---|---|
| 0125263 | 7/1983 | Japan | 360/94 |
| 182658 | 8/1986 | Japan | |
| 182660 | 8/1986 | Japan | |
| 269257 | 11/1986 | Japan | |
| 2105087 | 3/1983 | United Kingdom | 360/94 |

*Primary Examiner*—Robert S. Tupper
*Assistant Examiner*—Andrew L. Sniezek

*Attorney, Agent, or Firm*—Michael N. Meller

[57] ABSTRACT

A tape loading mechanism of a video tape recorder designed to play a standard size tape cassette and a compact size tape casette comprises a chassis carrying a pair of guide grooves at both sides of a guide drum toward a first area of the chassis on which the standard size tape cassette is held at the time of operation of the video tape recorder. The guide grooves are further extended toward a second area of the chassis defined inside the first area on which the compact size tape cassette is held. A pair of loading members are moved along the guide grooves toward their front ends close to the tape cassette when the compact size tape cassette is loaded so that loading poles in the loading members are accepted in a cutout portion formed at a front side of the compact size tape cassette. Further, the loading members are displaced toward the rear end of the guide grooves when the standard size tape cassette is loaded so that the loading poles are accepted in a depressed part formed at a front side of the standard size tape cassette. A light emitting element for detection of the end of the tape is held rotatably on an arm and changes in position responsive to the type of the tape cassette. A deformable member is provided on a tension arm which is connected to a brake member for applying resistance to the rotation of the supply reel, so as to avoid excessive slackening of the brake member when the tension arm is rotated to a position adapted for loading the compact size tape cassette. Further, a half loading arm is provided so as to prevent complete loading of the magnetic tape on the guide drum during high speed transportation of the magnetic tape.

14 Claims, 35 Drawing Sheets

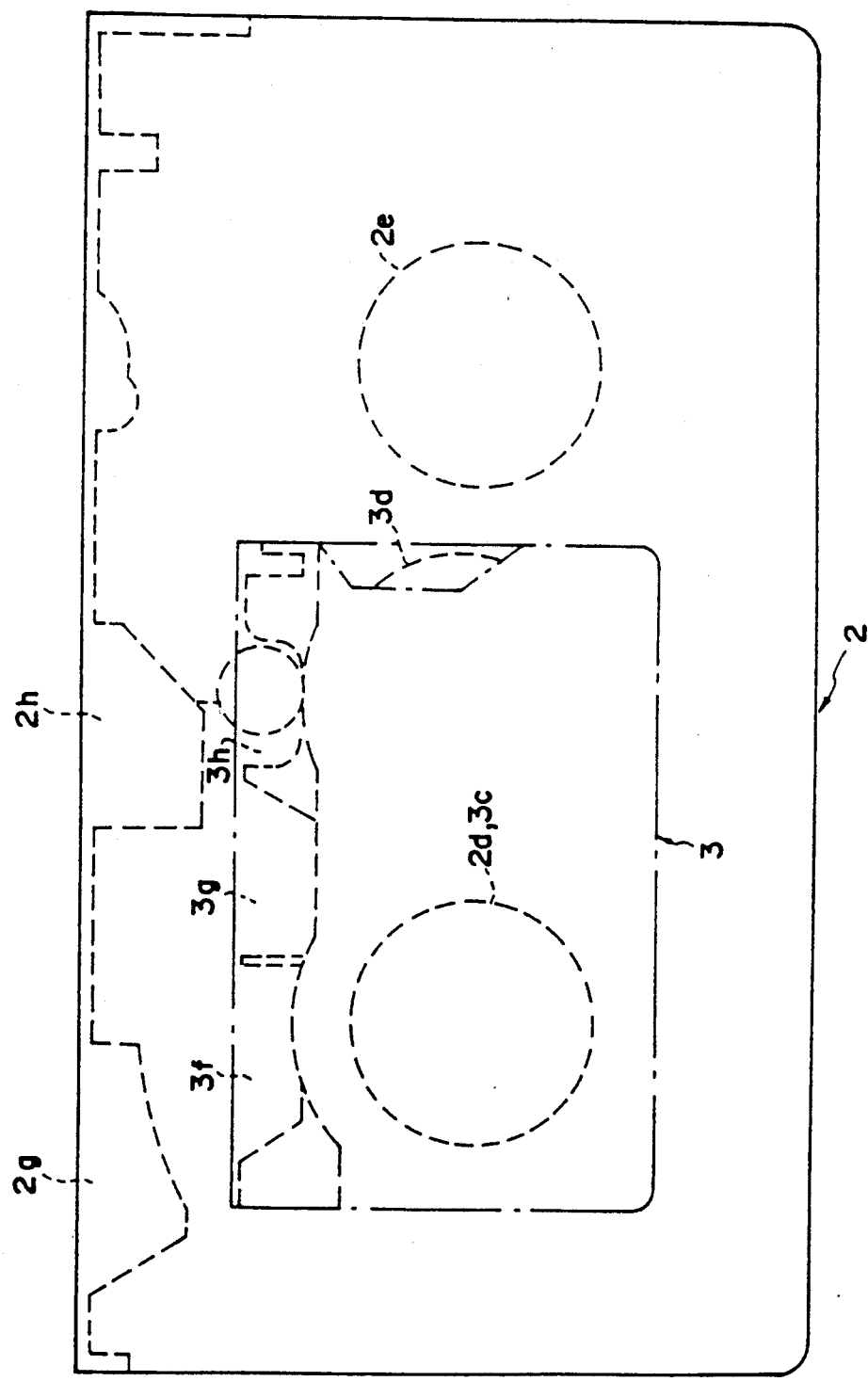

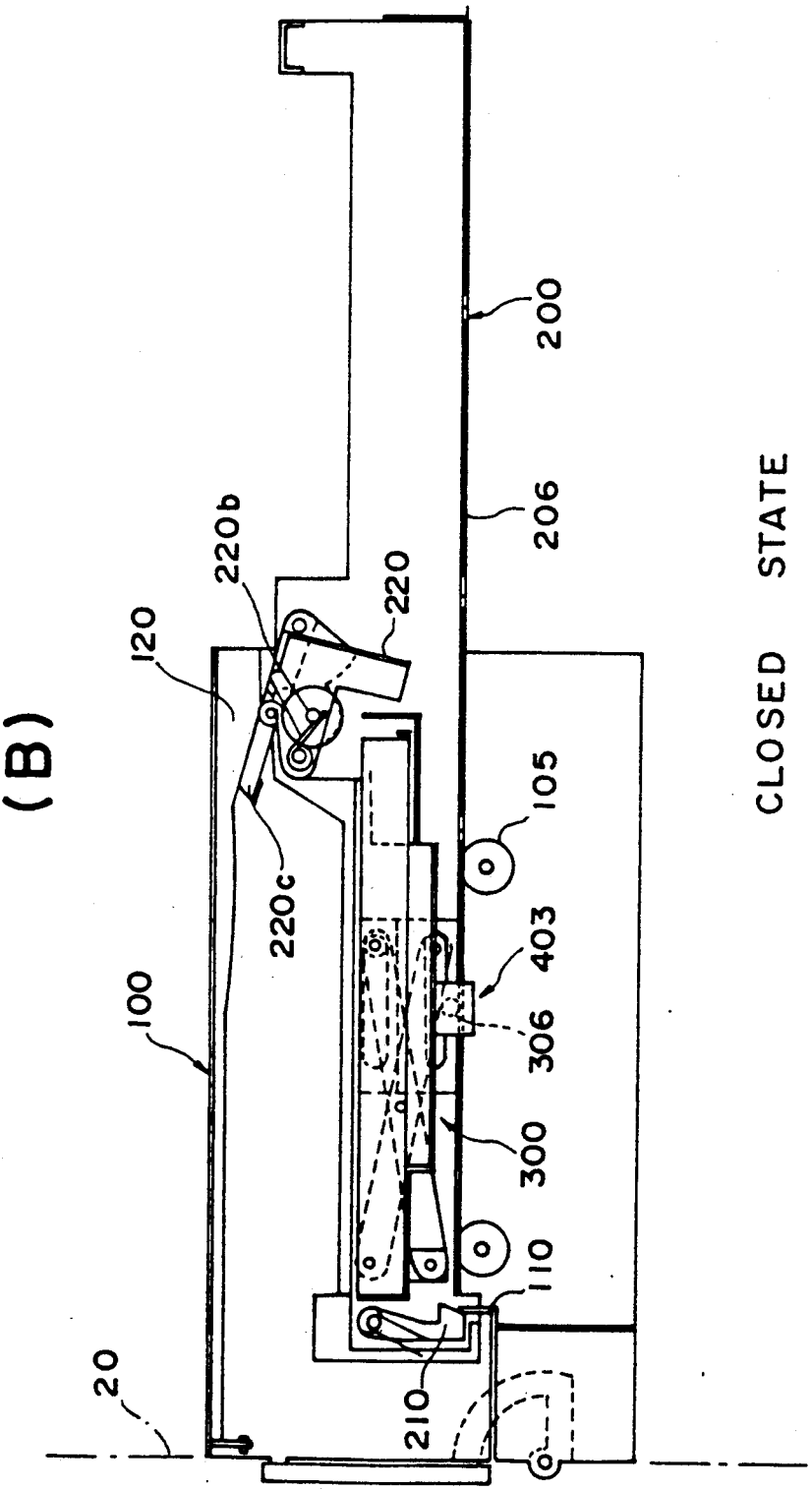

C STATE

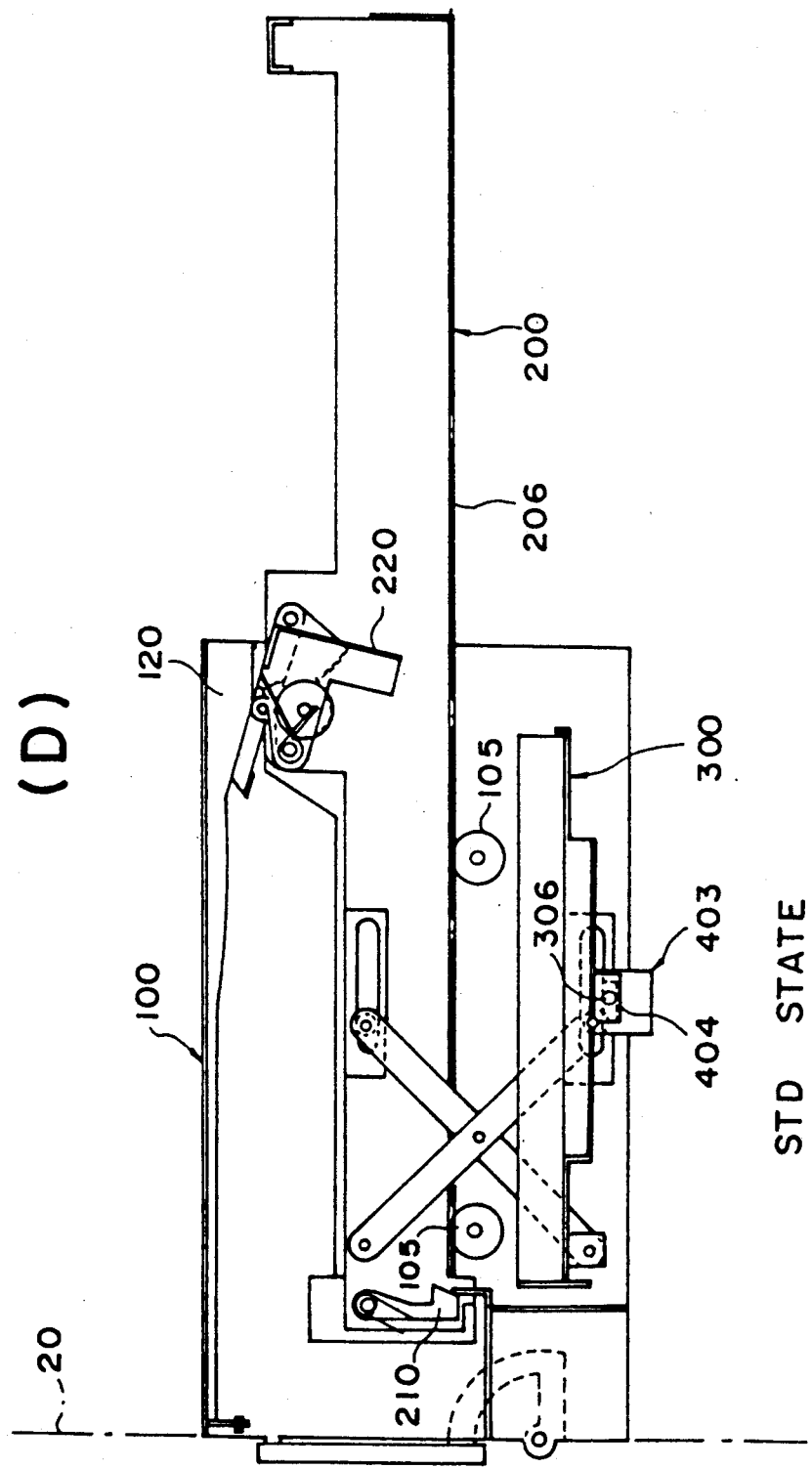

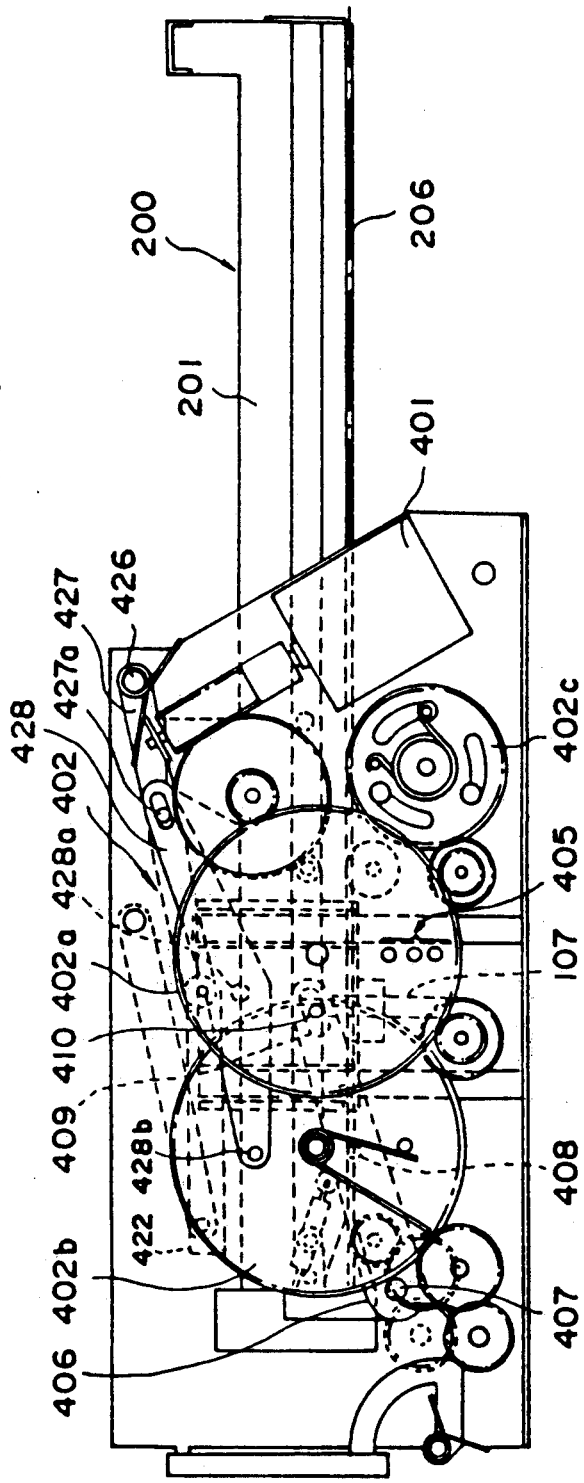
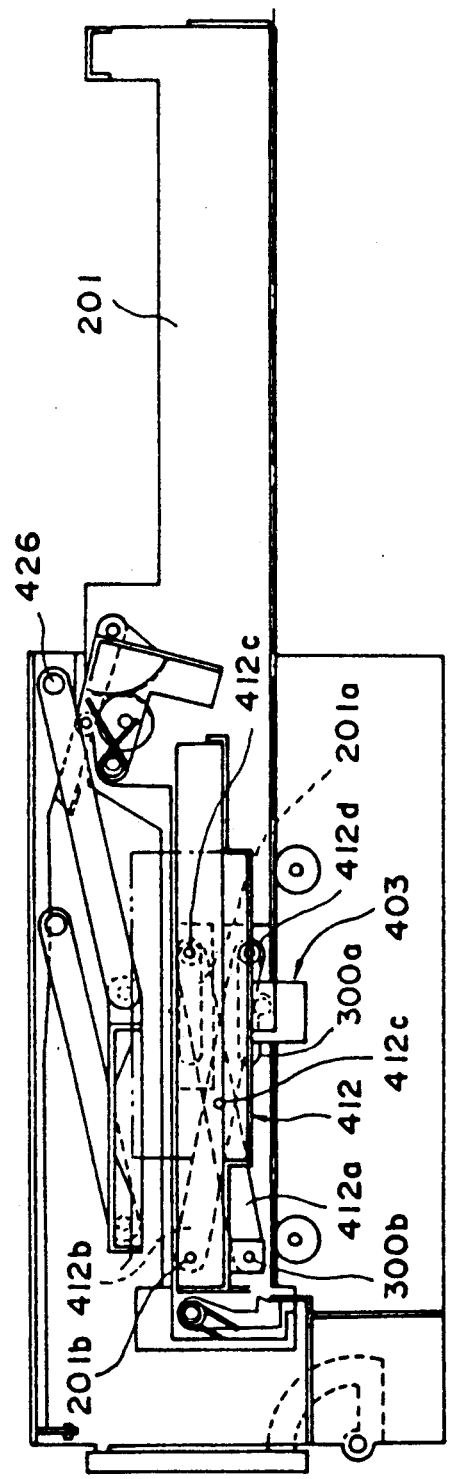
FIG. 4
FIG. 4A
FIG. 4B

"EJECT"

"CLOSE"

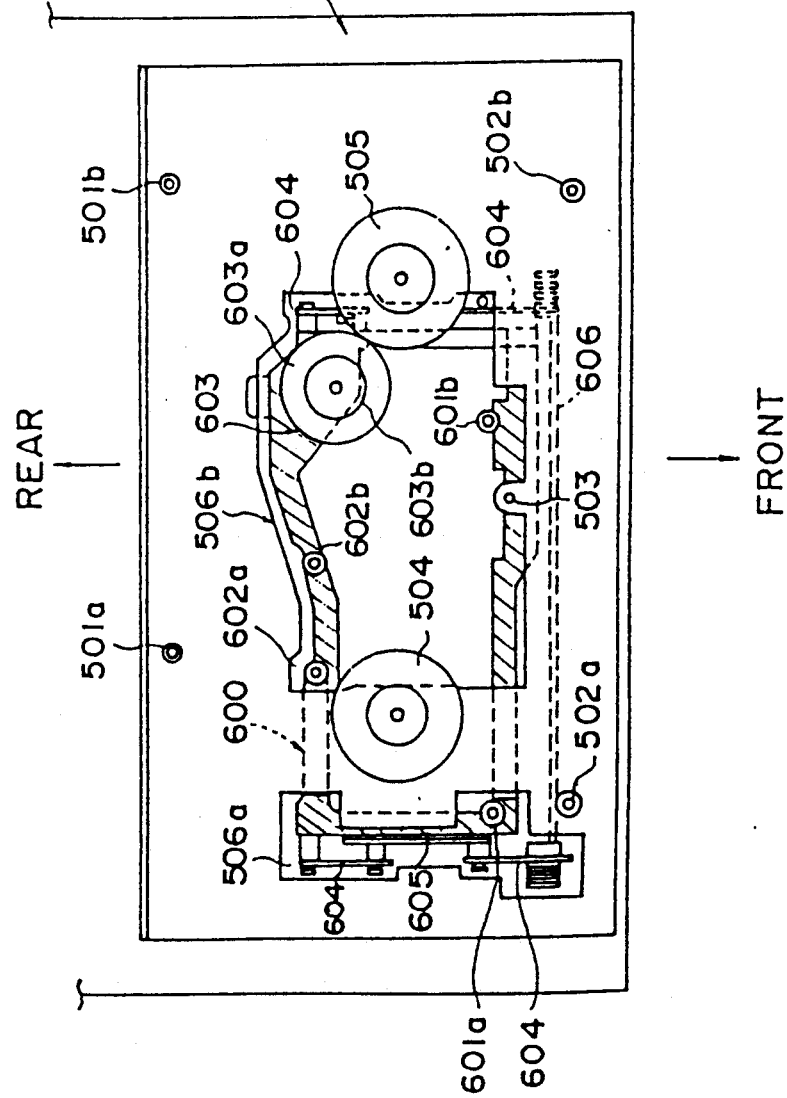
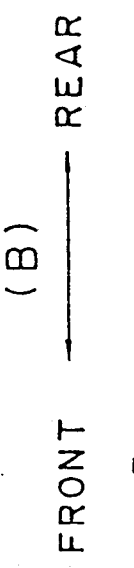
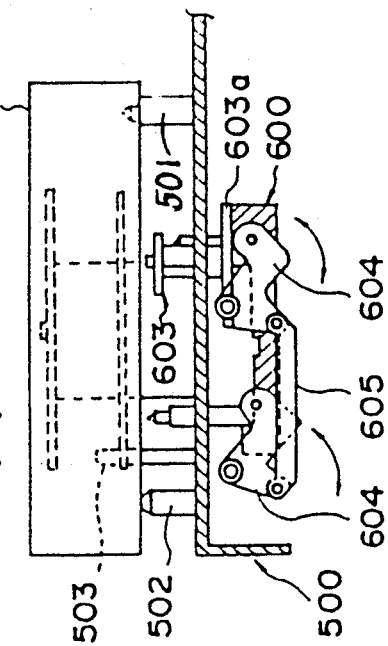
FIG. 7 (A)
FIG. 7 (B)
FIG. 7 (C)

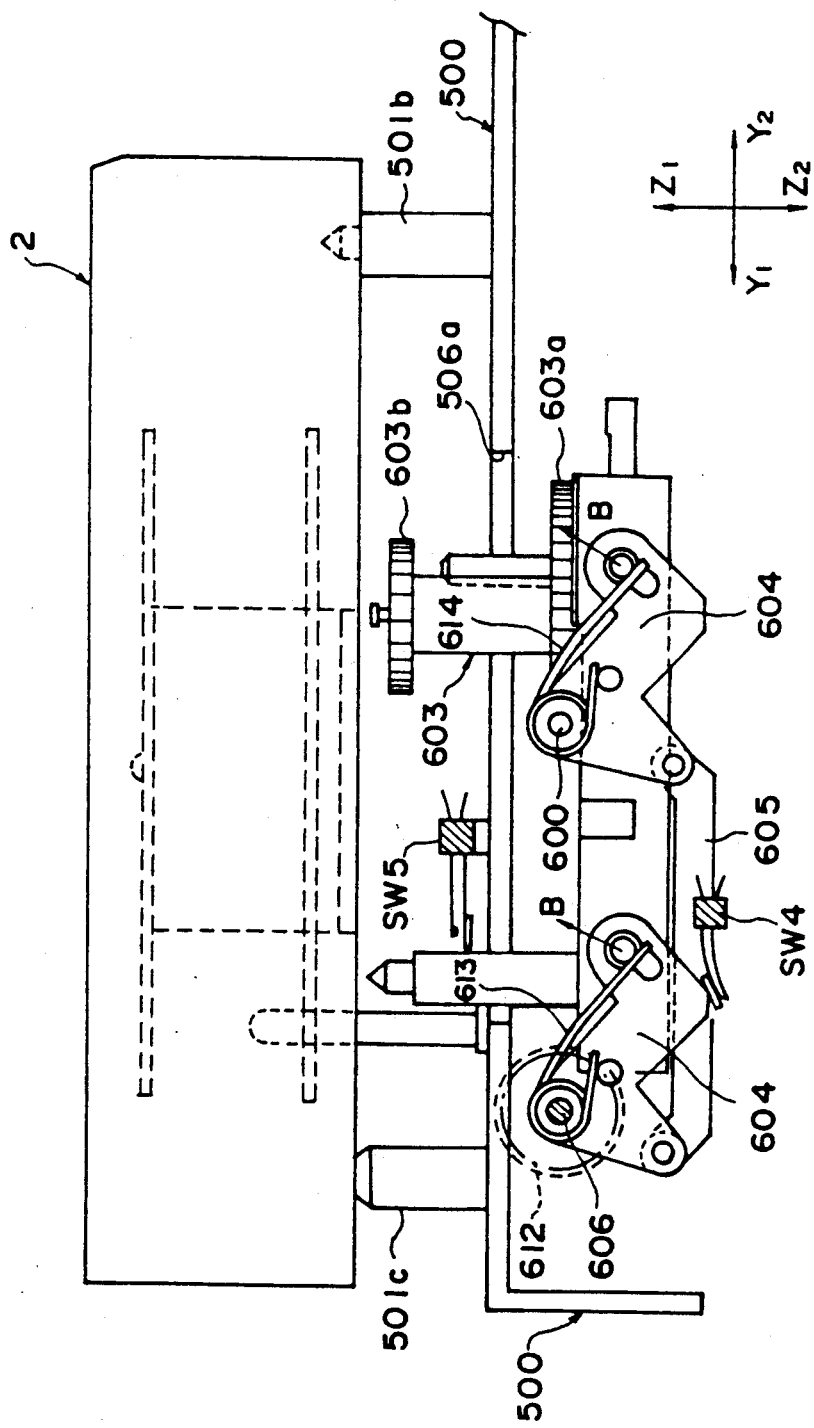

(A)

HALF LOADING (B)

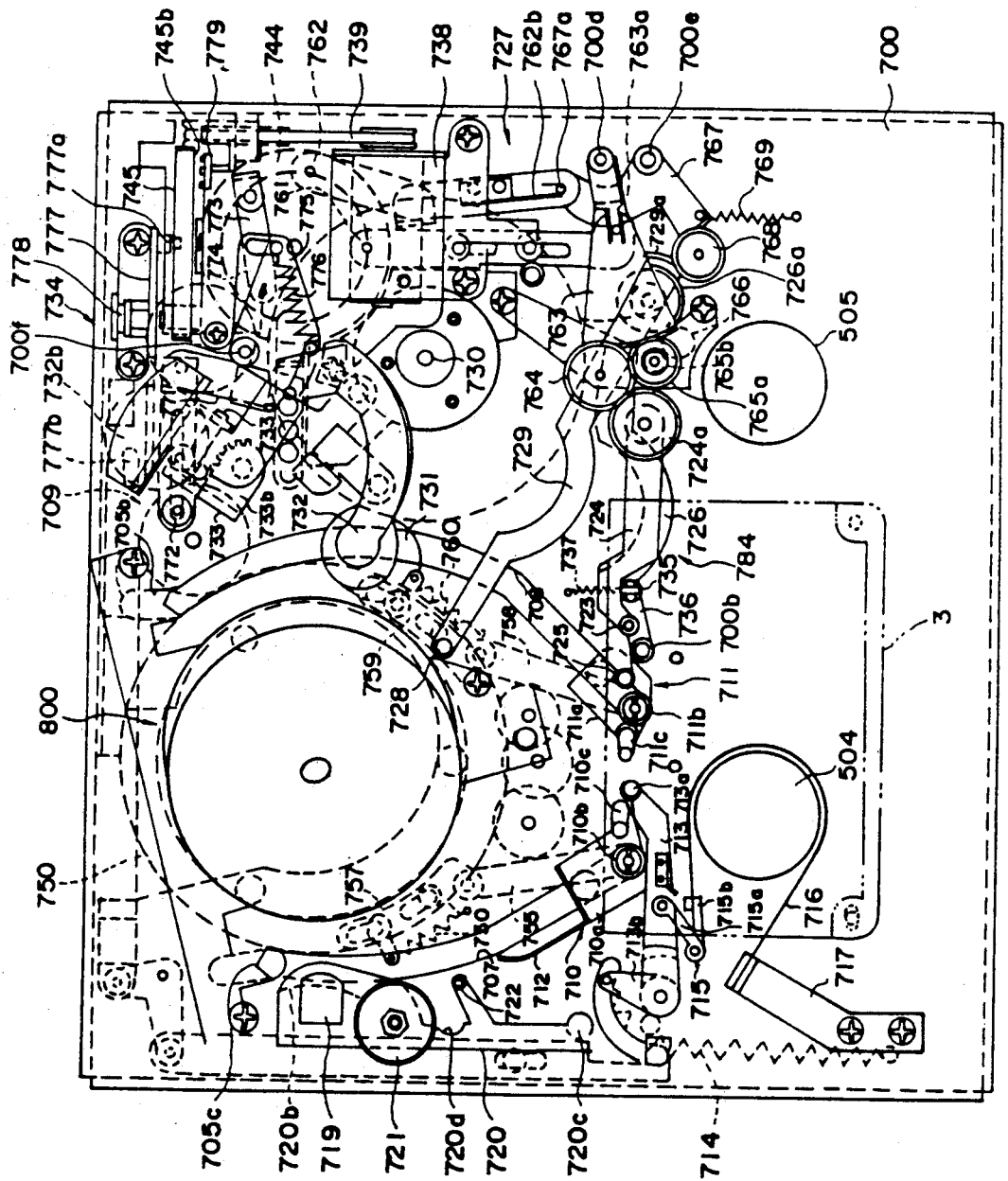

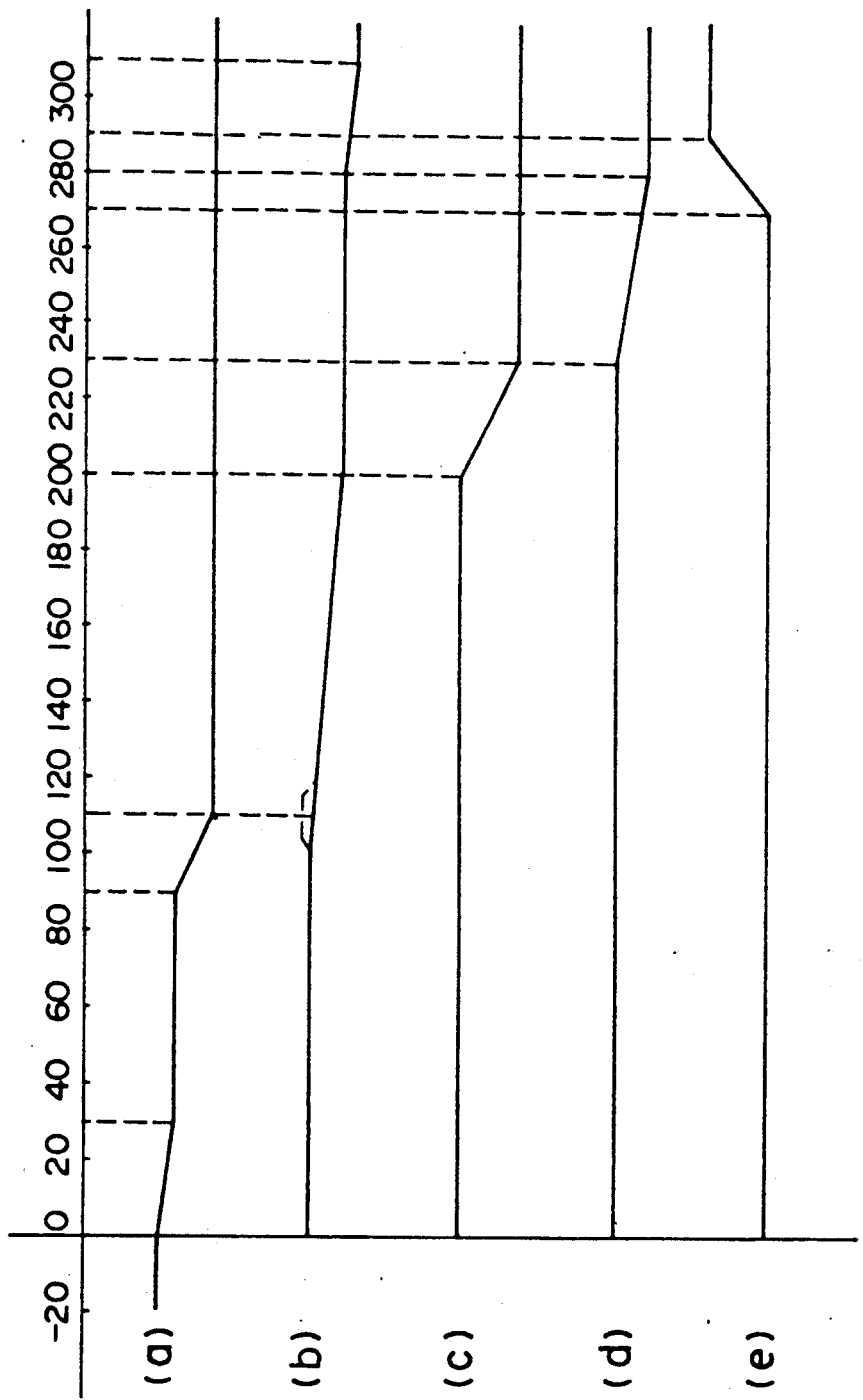

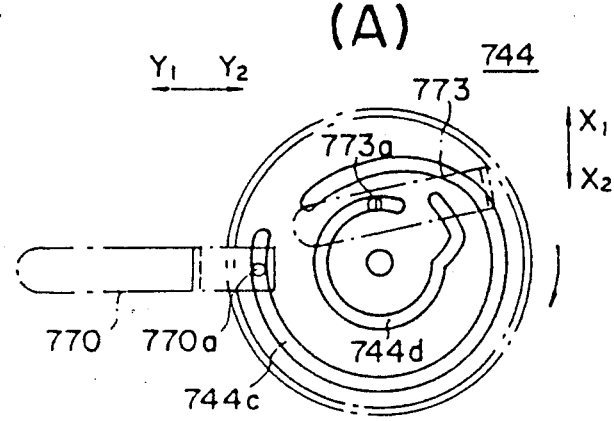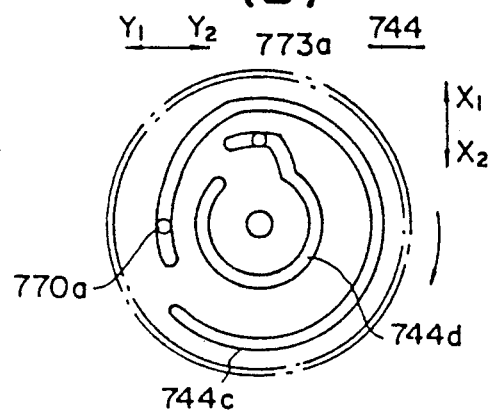
FIG. 20 (A)
FIG. 20 (B)
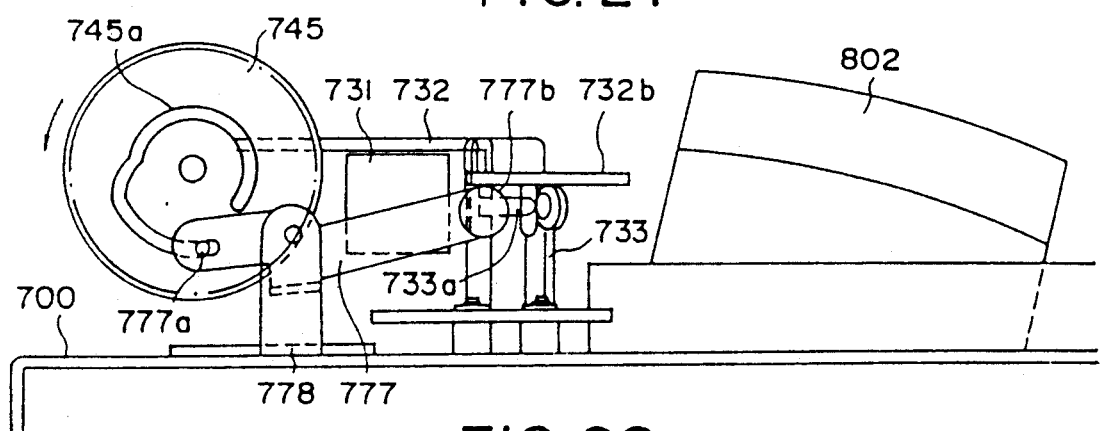
FIG. 21
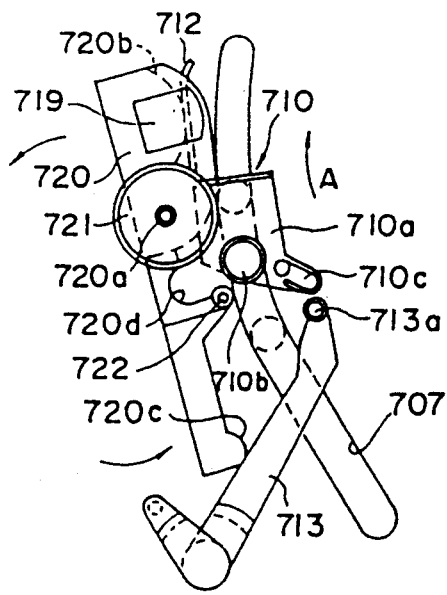
FIG. 22

TAPE CASETTE LOADING SYSTEM COMPATIBLE WITH TWO DIFFERENT SIZED CASSETTES

BACKGROUND OF THE INVENTION

The present invention relates in general to a magnetic recording and reproducing apparatus for recording and reproducing an information signal on and from a magnetic tape by means of a recording and reproducing system and in particular to a tape cassette loading system used in a magnetic recording and reproducing apparatus for loading and unloading a magnetic tape contained in a tape cassette on and from the recording and reproducing system of the apparatus.

Current magnetic recording and reproducing apparatus which record and reproduce an information signal on and from a magnetic tape such as a video tape recorder are loaded with a magnetic tape in a manner such that the magnetic tape is contained in a tape cassette for ease of handling as well as for protection of the magnetic tape. In order to load the magnetic tape contained in the tape cassette into the recording and reproducing system of the video tape recorder which includes a guide drum on which magnetic heads are carried, a cassette loading system is used for transporting the tape cassette from an eject position to a predetermined loading position defined relative to the position of the guide drum and for wrapping the tape around the guide drum in a predetermined manner. The loading system is used also for disengaging the magnetic tape from the guide drum and for transporting the tape cassette back to the initial eject position for removal of the tape cassette.

There are several types of tape cassettes which are currently sold in the market. One typical example of such a tape cassette is called a "standard size" tape cassette and is used widely in home video tape recorders. The aforementioned standard size tape cassette may have a typical dimension of 188×104×25 mm, for example, and accommodates a half inch wide magnetic tape wound around a supply reel and a take up reel with such an amount that a few hours of recording time is obtained. The specification for the tape cassette as well as for the recording format on the magnetic tape is standardized in relation to the type of the video tape recorder so that the magnetic tape cassettes produced by different manufacturers can be used as long as the specification matches with the type of the video tape recorder.

Recently, a more compact video tape recorder has been developed so as to realize a portable video tape recorder combined with a television camera and the like. Such a tape cassette has a reduced size so as to decrease the size and weight of the video tape recorder. In order to reduce the size, the compact size tape cassette contains a smaller amount of magnetic tape having a substantially reduced separation between a supply reel and a take up reel. On the other hand, the recording format of the video signal and the audio signal on the tape is identical to that of the "standard size" tape cassette, so that compatibility with the home video tape recorder currently in use is maintained.

Conventionally, such a compact size tape cassette is reproduced by the home video tape recorder by using an adapter having a size identical to the size of the standard size tape cassette into which the compact size tape cassette is accommodated, as the size and construction of the compact size tape cassette do not match with the loading system of the video tape recorder designed for the standard size tape cassette. However, the use of this adapter is cumbersome and indeed inconvenient. Thus, there is a demand for a cassette loading system of a video tape recorder which can handle both the standard size tape cassette and compact size tape cassette.

THe U.S. Pat. application entitled "Tape Cassette Loading System" filed by Mihara et al. based on the Japanese Patent Applications No.253096/1987, No.305165/1987 and No.305164/1987 claiming a priority date of Oct.7, 1987 and the U.S. Pat. application entitled "Tape Cassette Loading System" filed by Harumatsu et al. based on the Japanese Patent application No.260584/1987 claiming a priority date of Oct.15, 1987 disclose a loading system comprising a cassette tray on which a standard size tape cassette and a compact size tape cassette are alternatively placed. The cassette tray is carried by a carriage and is movable in a horizontal direction into and out from the body of the video tape recorder. Further, the cassette tray is carried by an elevating mechanism and is movable in a vertical direction. Thus, the standard size or compact size tape cassette placed on the cassette tray is transported to the inside of the video tape recorder horizontally and then transported vertically to the predetermined loading position.

In order to load the magnetic tape in the tape cassette on the guide drum of the video tape recorder, a tape loading mechanism is further needed which enters into the tape cassette and draws out the magnetic tape from the tape cassette in order to wrap the magnetic tape around the guide drum as well as for engaging a drive mechanism with the take up reel and supply reel of the tape cassette. As the aforementioned tape cassette loading system handles both the standard size tape cassette and the compact size tape cassette, such a loading system should be equally capable of handling the magnetic tape contained in the standard size tape cassette and in the compact size tape cassette. However, the size and shape of a cutout portion formed in the tape cassette for allowing , entrance of the tape loading mechanism is different for the standard size tape cassette and the compact size tape cassette. This means that the tape loading mechanism must be displaced responsive to the type of tape cassette to be loaded. Therefore, there is a need for a tape loading mechanism which can be displaced or shifted responsive to the type of tape cassette to be played.

A conventional video tape recorder uses a light emitting element for detection of the end of the magnetic tape. In the tape cassette loading system as described previously, it is necessary, that the position of such a light emitting element be displaced responsive to the type of tape cassette to be played. Thus, there is a need for a mechanism to move the light emitting element responsive to type of the tape cassette.

Furthermore, the conventional video tape recorder applies a weak brake to the rotation of a supply reel in the tape cassette during the recording or reproducing operation to such an extent that the magnetic tape is applied with a proper amount of tension and slackening of the magnetic tape is eliminated. For this purpose, a brake band the periphery of a reel disk which supports the supply reel of the tape cassette and the rotation of the reel disk is braked. In the aforementioned tape cassette loading system adapted for loading the standard size tape cassette and the compact size tape cassette, there is a problem that the brake band adapted to brake the supply reel of the standard size tape cassette during the recording and reproducing operation of the video tape recorder is excessively slackened during the loading of the compact size tape cassette.

SUMMARY OF THE INVENTION

Accordingly, it is a general object of the present invention to provide a novel and useful tape cassette loading system wherein the aforementioned problems are eliminated.

Another and more specific object of the present invention is to provide a tape cassette loading system of a magnetic recording and reproducing apparatus comprising a tape loading mechanism for drawing out a magnetic tape contained in the tape cassette and for wrapping the magnetic tape thus drawn out around a rotary drum of the magnetic recording and reproducing apparatus wherein the tape loading mechanism is displaced in position responsive to the type of tape cassette to be played so that the tape loading mechanism assumes a first position ready for drawing out the magnetic tape from a standard size tape cassette when the standard size tape cassette is to be played and a second position ready for drawing out the magnetic tape cassette from a compact size tape when the compact size tape cassette is to be played.

Another object of the present invention is to provide a tape cassette loading system of a magnetic recording and reproducing apparatus comprising cassette loading means adapted to hold a standard size tape cassette and a compact size tape cassette, said cassette loading means being movable between an unloading state ready for placement or removal of the tape cassette and a ready-for-loading state ready for drawing out a magnetic tape contained in the tape cassette so as to wrap the magnetic tape around a guide drum of the magnetic recording and reproducing apparatus, tape loading means for drawing out the magnetic tape from the tape cassette and wrapping the magnetic tape around the guide drum, said tape loading means comprising a tape loading member movable along a guide groove between a first position in which the tape loading member is ready for drawing out the magnetic tape from the standard size tape cassette and a loading position in which the magnetic tape is fully wrapped around the rotary drum, and a reel drive means adapted for engaging with a supply reel and a take up reel of the tape cassette placed on the cassette loading means for driving the supply reel and the take up reel, wherein said groove is extended towards the compact size tape cassette such that there is defined another position for the tape loading member along the guide groove at a position away from the loading position relative to said first position in which the tape loading member is ready for drawing out the magnetic tape from the compact size tape cassette. According to the present invention, the standard size tape cassette and the compact size tape cassette are loaded in the same magnetic recording and reproducing apparatus without having to use a separate adapter which is conventionally used for loading the compact size tape cassette in the magnetic tape recorder designed to play the standard size tape cassette. As a result, complex and tedious loading procedures to be performed by the user for loading the compact size tape cassette in the adapter and also for loading the adapter thus loaded with the compact size tape cassette in the magnetic recording and reproducing apparatus are eliminated. Further, the tape cassette loading system of the present invention can establish a stable path for the magnetic tape as a result of the stable and reliable movement of the tape loading member of the tape loading mechanism responsive to the type of tape cassette to be played. Furthermore, the mechanism used in the tape cassette loading system of the present invention is relatively simple and can be manufactured at a relatively cheap cost.

Another object of the present invention is to provide a tape cassette loading system adapted for loading a standard size tape cassette and a compact size tape cassette on a magnetic recording and reproducing apparatus in which a light emitting element for detection of the end of a magnetic tape in the tape cassette is displaced responsive to the type of tape cassette to be played. According to the present invention, the end of the magnetic tape can be detected reliably even if the type of tape cassette is changed.

Another object of the present invention is to provide a tape cassette loading system adapted for loading a standard size tape cassette and a compact size tape cassette on a magnetic recording and reproducing apparatus in which an excessive slackening in a brake band used for applying a brake to the rotation of a supply reel of the tape cassette so as to maintain a proper tension in the magnetic tape during the recording and reproducing operation of the magnetic recording and reproducing apparatus is removed by a deformable member. Such a slackening appears when the compact size tape cassette is played in the magnetic recording and reproducing apparatus. According to the present invention, the deformable member is deformed when the slackening in the brake band appears and the slackening is eventually eliminated.

Another object of the present invention is to provide a tape cassette loading system adapted for loading a standard size tape cassette and a compact size tape cassette on a magnetic recording and reproducing apparatus in which a member is used for preventing the magnetic tape from being fully wrapped around a guide drum of the magnetic recording and reproducing apparatus when the magnetic tape is transported with a high speed while maintaining tangential contact with the guide drum. According to the present invention, the risk of the magnetic tape being damaged during the high speed transportation is substantially eliminated.

Still other objects and further features of the present invention will become apparent from the following detailed description of the preferred embodiments of the present invention when read in conjunction with the drawings.

BRIEF DESCRIPTION OF THE DRAWINGS

FIGS.1(A)–(D) are perspective views showing a standard size tape cassette and a compact size tape cassette used in the tape cassette loading system of the present invention and a plan view showing the relation between the standard size tape cassette and the compact size tape cassette;

FIGS.4(A) and (B) are side views respectively showing mechanisms for moving a cassette tray which holds the standard size tape cassette or compact size tape cassette in a horizontal direction and in a vertical direction;

FIGS.7(A)–(C) are a plan view and two side views showing a sub-chassis which carries a reel drive mechanism;

FIG.19 is a graph showing the movement of various parts in the tape loading mechanism responsive to the rotation of the cam wheel shown in FIGS.18(A)–(D);

FIGS.20(A) and (B) are diagrams showing a pattern of cam grooves formed on an upper surface of the main cam wheel shown in FIGS.18(A)–(D);

FIG.21 is a rear view showing the tape loading mechanism seen from a backward direction;

FIG.22 is a plan view for explaining the operation of a tension arm used in the tape loading mechanism;

DETAILED DESCRIPTION

Figure 1A:
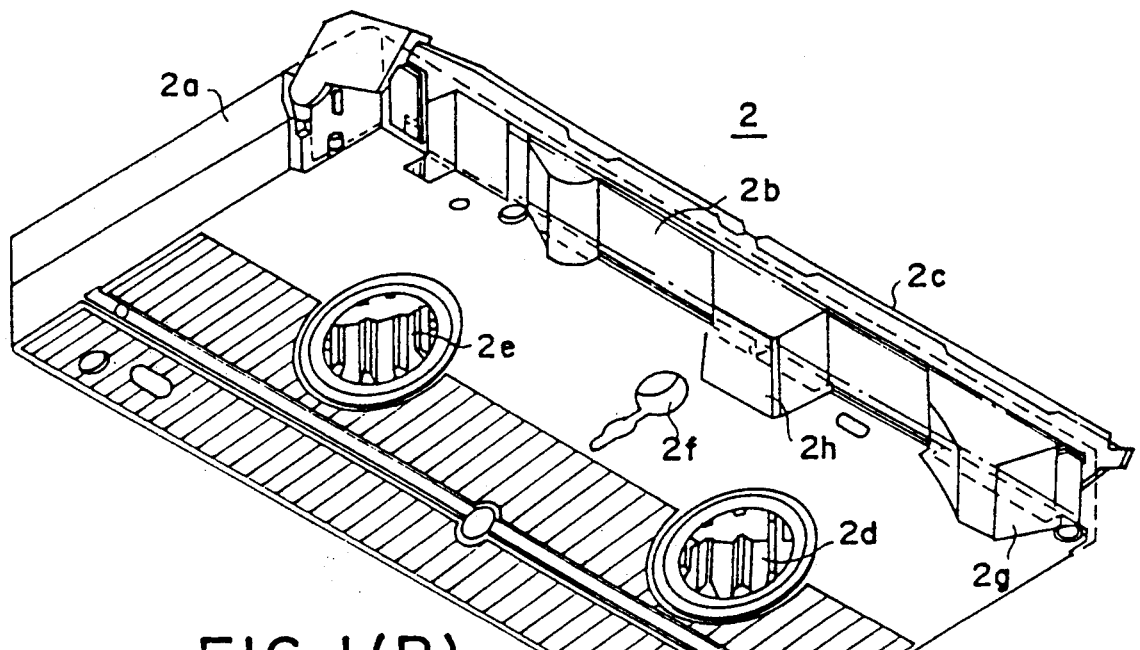

FIG.1(A) shows a standard size tape cassette 2 used in the tape cassette loading system of the present invention. Referring to the drawing, the standard size tape cassette 2 comprises a housing 2a, and a supply reel and a take up reel (not shown) are accommodated in the housing 2a. A magnetic tape is wound on a supply reel and the take up reel and a tape path 2b is formed along a front side of the housing 2a. At a bottom of the housing 2a, there are provided an opening 2d for accepting a drive hub for driving the take up reel, an opening 2e for accepting a drive hub for driving the supply reel, and another opening 2f adapted for accommodating a light emitting element for detection of the end of the magnetic tape. At the front side of the housing 2a, there are provided a cutout portion 2g for accepting a part of a tape loading mechanism to be described and another cutout portion 2h for accepting another part of the tape loading mechanism.

Figure 1B:
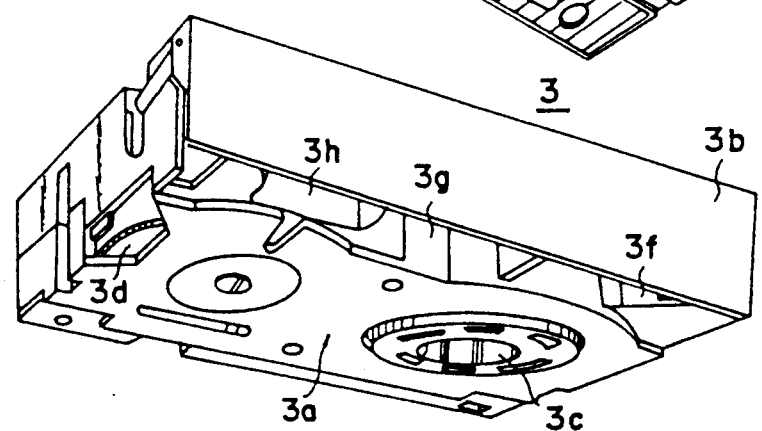
Figure 1C:
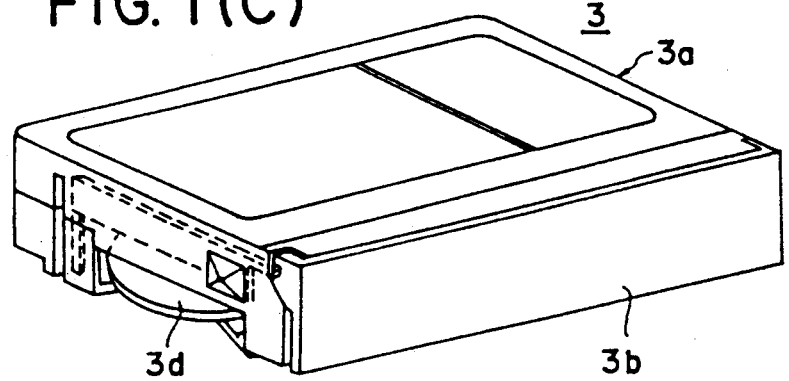

FIGS.1(B) and (C) show a compact size tape cassette 3 used in the tape cassette loading system of the present invention. Referring to the drawings, the compact size tape cassette 3 comprises a housing 3a, and a supply reel and a take up reel (not shown) are accommodated in the housing 3a. At a bottom of the housing 3a, there is formed an opening 3c for accepting a drive hub for driving the supply reel. Further, a toothed flange 3d of the take up reel is exposed at the bottom of the housing 3a. Furthermore, at a front side of the housing 3a, there are formed a cutout 3f for accepting a part of the tape loading mechanism to be described, a cutout 3g for accepting another part of the tape loading, mechanism, and a cutout 3h for accepting still another part of the tape loading mechanism as well as for accepting a light emitting element used for detection of the end of the magnetic tape. Thus, the dimension and shape of the standard size tape cassette and the separation between the supply reel and the take up reel in the standard size tape cassette are different from those of the compact size tape cassette. Further, the mechanism for driving the take up reel is different.

FIG.1(D) shows the relation between the standard size tape cassette and the compact size tape cassette on the tape cassette loading system of the present invention. As will be described later, the tape cassette loading system of the present invention uses a cassette tray on which the standard size tape cassette and the compact size tape cassette are placed alternatively. In the tape cassette loading system, the compact size tape cassette 3 is placed on the cassette tray such that the opening 3c is located at a position which coincides with a position assumed by the opening 2d when the standard size tape cassette 2 is placed on the cassette tray. It should be noted that as a result of the relationship between the compact size tape cassette and the standard size tape cassette, the cutout portions 3f, 3g and 3h are located inside a region of the cassette tray on which the standard size tape cassette is placed. In other words, the cutout portions 3f, 3g and 3h are located on the cassette tray inside the region defined by the contour of the standard size tape cassette 2.

Next, the tape cassette loading system in which the tape loading mechanism of the present invention is used will be described with reference to FIGS.2-12. The tape cassette loading system of the present invention uses a cassette loading mechanism comprising a cassette tray which is a generally rectangular tray adapted for accepting a standard size tape cassette and further having a depression adapted for accepting a compact size tape cassette, a carriage for carrying the cassette tray in a horizontal direction between a first state in which the cassette tray is located substantially outside the video tape recorder so that the user can easily place and remove the standard size tape cassette or compact size tape cassette on and from the cassette tray and a second state in which the cassette tray is located inside the video tap recorder substantially above a ready-for-loading position in which the magnetic tape in the tape cassette is in a position ready for being drawn out so that the magnetic tape is wrapped around the guide drum, and a cassette tray drive mechanism for moving the carriage in a horizontal direction and for moving the cassette tray in a vertical direction between said second state, a first ready-for-loading position for the compact size tape cassette, and a second ready-for-loading position for the standard size tape cassette. Detailed disclosure for the aforementioned part of the tape loading system will be found in the aforementioned U.S. Pat. application by Mihara et al. which was filed claiming a priority date of Oct. 7,1987.

Figure 2A:
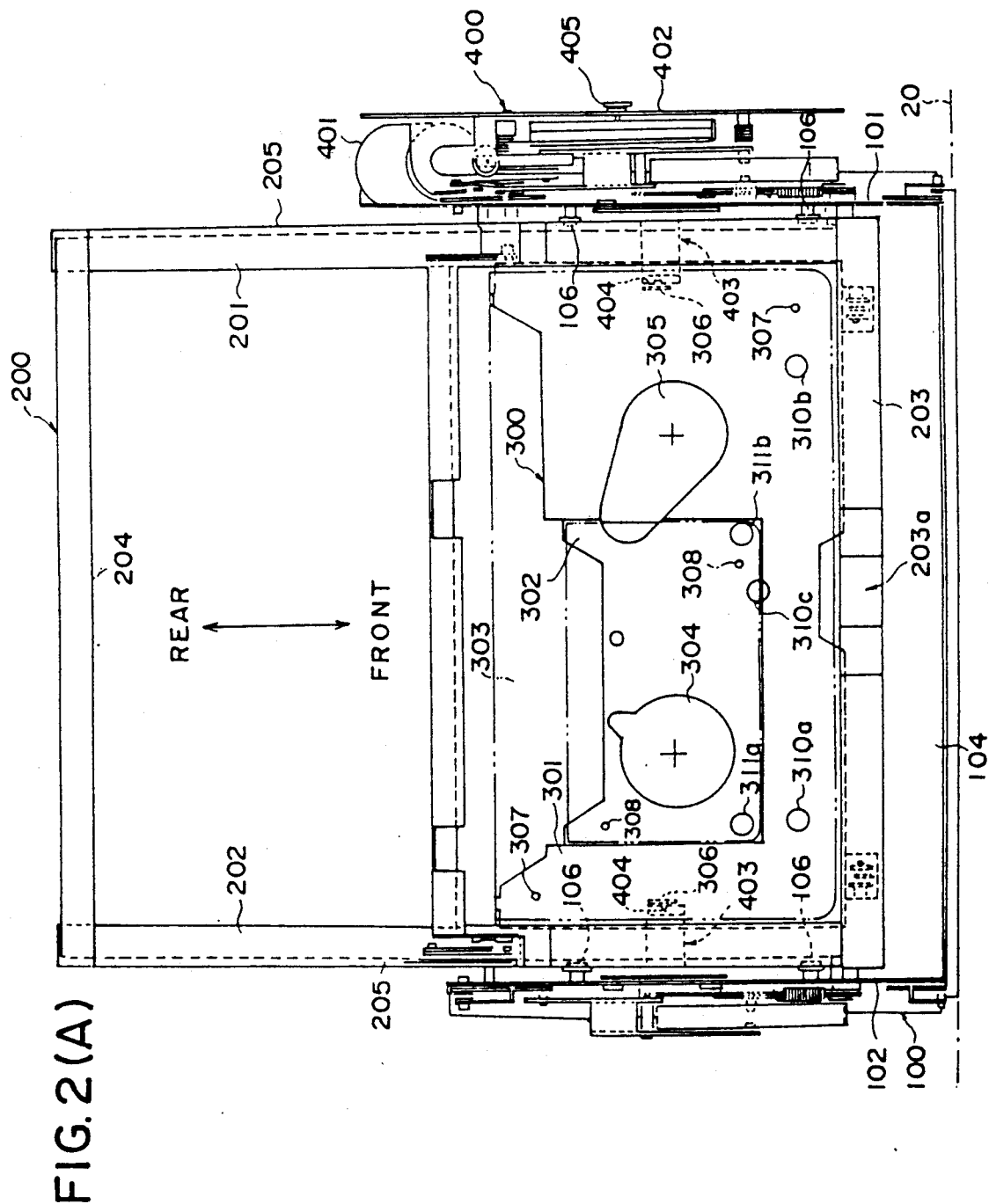
FIGS.2(A) and (B) are respectively a plan view and a front view showing an embodiment of the tape cassette loading system of the present invention.
Figure 2B:
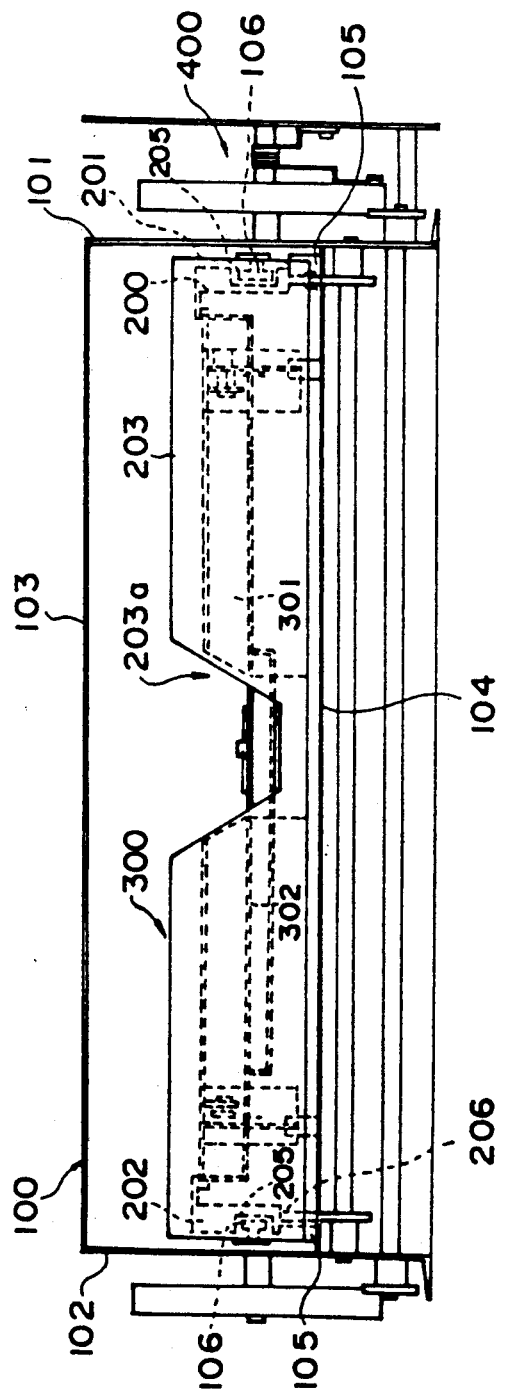
Figure 3A:
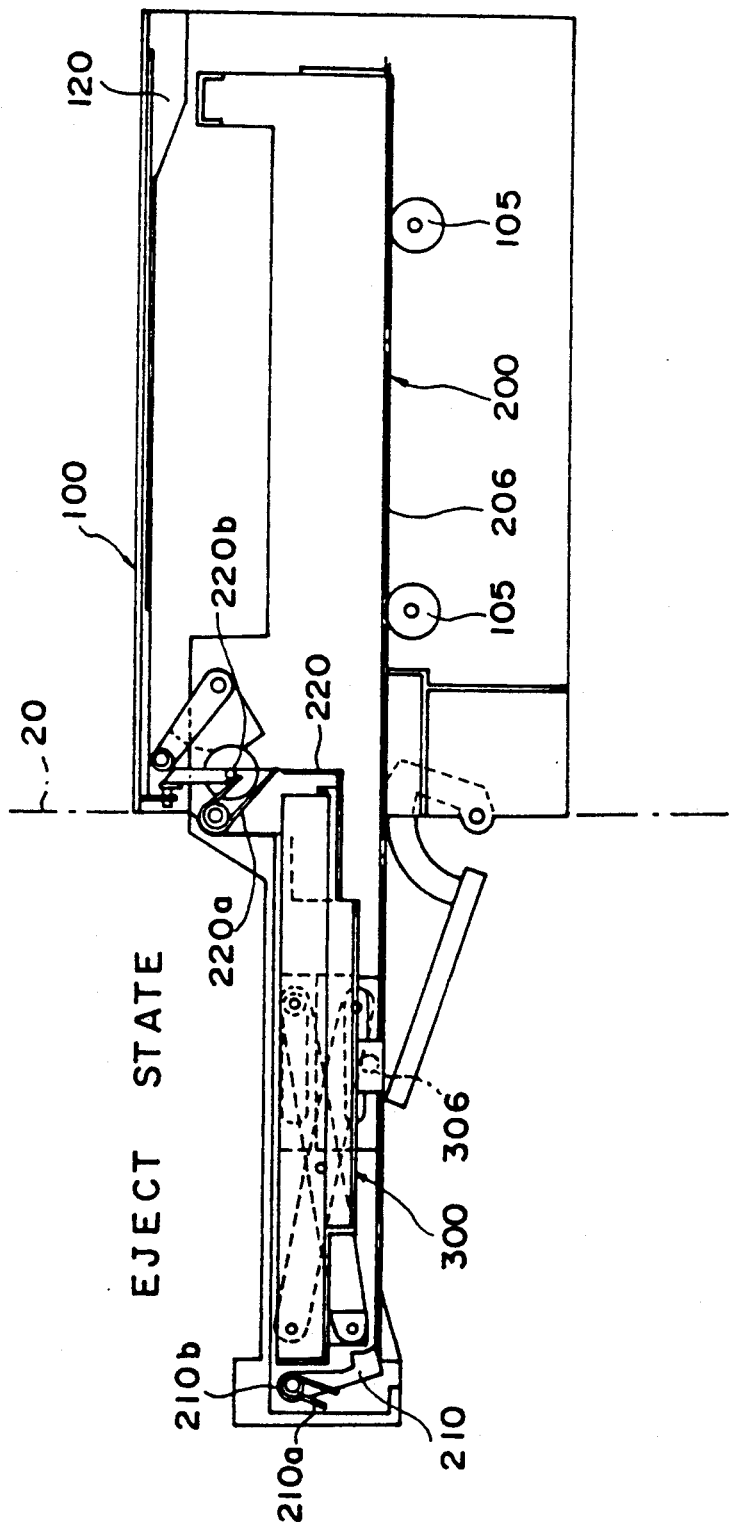
FIGS.3(A)–(D) are side views showing various states of the tape cassette loading system of FIGS.2(A) and (B)

Referring to FIGS. 2(A) and (B), the cassette loading mechanism of the present invention comprises a housing 100, a carriage 200, a cassette tray 300 and a cassette tray drive mechanism 400. The housing 100 comprises a pair of side walls 101 and 102, a top wall 103 and a bottom wall 104 as clearly seen in FIG. 2(B). The side walls 101 and 102 are provided with a pair of vertical guide grooves 107a and 107b to be described later, and carry a pair of opposing rollers 105 and another pair of opposing rollers 106 at the respective internal surfaces (see FIG. 3(A) and (B)). The carriage 200 comprises a pair of side frames 201 and 202, and a pair of front and rear frames 203 and 204. The side frames 201 and 202 are supported on the guide rollers 105 and are movable horizontally in a front direction and a rear direction. In the present specification, the rear direction is defined as the direction indicating the inside of a body 20 of the video tape recorder and the front direction is defined as the direction indicating the outside of the body 20 of the video tape recorder as shown in FIG. 2(A). Further, each of the side frames 201 and 202 are provided with a guide groove 205 extending along the frame, and the aforementioned guide rollers 106 engage the guide grooves 205 as can be seen in FIG. 2(B). Thus, the carriage 200 is movable horizontally in the front and rear directions stably guided by the guide rollers 105 and 106. At the bottom of the side frames 201 and 202 to which the guide rollers 105 are engaged, a toothed portion 206 is formed as can be seen in FIGS. 3(A) and (B). This toothed 206 portion engages a gear of a cassette tray drive mechanism 400 including a motor 401 shown in FIG. 2(A) as will be described later with reference to FIGS. 4(A) and (B), and the carriage 200 is moved horizontally in the front and rear directions responsive to energization of the motor 401.

The cassette tray 300 is a generally rectangular tray as can be seen in FIG. 2(A) and comprises a main part 301 for supporting the standard size tape cassette 1 placed thereon and a generally rectangular depression 302 for supporting the compact size tape cassette 7. As can be seen in the drawing, the depression 302 is formed n a part of the main part 301. Further, the main part 301 and the depression 302 are formed with a cutout 303 for allowing entrance of a tape loading member to be described later with reference to FIG. 10 and a pair of openings 304 and 305 for allowing insertion of a reel drive mechanism to be described later with reference to FIGS. 7(A)–(C) for driving of the take up reel and the supply reel. The cassette tray 300 further has a pair of pins 306 close to the center of its right side edge and its left side edge. These pins 306 engage a U-shaped groove 404 (FIG. 3(C)) of an elevating member 403 which moves vertically responsive to the mechanism 400. Further, the cassette tray 300 carries switches 307 for detecting the placement of the standard size tape cassette on the main part 301 and switches 308 for detecting the placement of the compact size tape cassette on the depression 302. The switches 307 and 308 may each be a type of switch which is closed by the weight of the tape cassette placed on the cassette tray. In other words, the switch 307 is closed when the standard size tape cassette is placed on the main part 301 of the cassette tray 300 and the switch 308 is closed when the compact size tape cassette is placed on the depression 302 of the cassette tray 300.

FIG. 2(B) further shows a conspicuous cutout 203a provided on the rear frame 203 of the carriage 200. This cutout is for faciliating the removal of the standard size tape cassette placed on the cassette tray 300. A corresponding cutout is formed also on the rear wall of the cassette tray 300.

FIG. 3(A) shows a state in which the carriage 200 in fully moved toward the front direction and the cassette tray 300 is located outside the body 20 of the video tape recorder. This state is called an unloading position and will be designated as an EJECT state. In this state, the placement or removal of the tape cassette on and from the cassette tray 300 can be made by the user without difficulty. FIG.3(B) on the other hand shows a state in which the carriage 200 is fully moved toward the rear direction into the body 20 of the video tape recorder. In the following description, this state will be referred to as a CLOSED state. FIG.3(C) shows another state in which the cassette tray 300 is lowered by the mechanism 400 to a state in which the compact size tape cassette on the cassette tray 300 assumes a position ready for loading the magnetic tape on a drum (not shown) of the video tape recorder. This state will be referred to as a C state. FIG.3(D) on the other hand shows a state in which the cassette tray 300 is fully lowered by the mechanism 400. In this state, the standard size tape cassette held on the cassette tray 300 assumes a position ready for loading the magnetic tape of the tape cassette on the guide drum of the video tape recorder. The difference in the level of the cassette tray 300 between the C state and a standard state shown in FIG.3(D) arises due to the difference in the size of the tape cassette. Thus, this standard state will be called an STD state.

FIGS.3(A)–(D) further show a mechanism for releasably holding the cassette tray 300 on the carriage 200. The mechanism comprises a catch 210 rotatably provided on the carriage 200 around a pin 210b and a closing member 220 rotatably held on the carriage 200 around a pin 220b. The catch 210 is urged in a counterclockwise direction in FIG.3(A) by a spring 210a and holds a front end of the depression 302 formed in the cassette tray 300. Further, the closing member 220 is urged by a spring 220a in a clockwise direction and holds the cassette tray 300. In the EJECT state shown in FIG. 3(A), the closing member 220 closes the cutout 303 formed at the rear end of the cassette tray 300. Thus, the closing member 220 not only holds the cassette tray 300 on the carriage 200 but also protects the video tape recorder from penetration of dust through the cutout 303 when the cassette tray 300 is fully moved in the front direction. When the carriage 200 is moved in the rear direction to the CLOSED state shown in FIG. 3(B), the catch 210 engages a stopper 110 formed on the housing 100 and is rotated in the clockwise direction. Thus, the catch 210 is released from the cassette tray 300. Further, a lever portion 220b formed on the closing member 220 engages a slope 120 formed on the housing 100 and the closing member 220 is rotated in the counterclockwise direction as shown in FIG. 3(B). In this state, the closing member 220 is released from the cassette tray 300. In other words, the cassette tray 300 is disengaged from the carriage 200 in the CLOSED state and is held in the elevating member 403 of the mechanism 400.

Next, the drive mechanism 400 will be described with reference to FIGS. 4(A) and (B). The drive mechanism 400 comprises the motor 401 and a gear train 402 comprising a main gear 402a, a cam gear 402b and a carriage drive gear 402c. The main gear 402a is rotated responsive to the rotation of the motor 401, and the cam gear 402b and the carriage drive gear 402 are rotated responsive to the rotation of the main gear 402a. The carriage drive gear 402 is meshed with the toothed portion 206 formed on the side frame 201, 202 of the carriage 200 and the carriage 200 is moved horizontally in the front direction or in the rear direction responsive to the energization of the motor 401. Further, the mechanism 400 comprises a swing arm 406 which is rotatably fixed on the side wall 101 of the housing 100 by a pin 407. The cam gear 402b carries on its inner side a generally spiral-shaped cam groove 415 (FIGS. 5(A)–(D)) and a pin 408 formed on an intermediate position on the arm 406 the cam groove 415. As can be seen from FIGS. 5(A)–(D), the cam groove 415 comprises a concentric part 415a positioned at a constant distance from the center of the cam disk 402b and a spiral part 415b which increases in distance from the center of the cam gear 402b with the rotation of the cam gear 402b. Thus, the arm 406 does not move as long as the pin 408 engages the concentric part 415a of the groove 415 while the arm 406 is swung upwards or downwards responsive to the rotation of the cam gear 402b when the pin 408 engages the spiral part 415b of the groove 415. The arm 406 has on its tip end far from the end where it is held on the side wall 101 by the pin 407 an elongated hole 409, and a pin 410 which is connected to the aforementioned elevating member 403 engages the hole 409. The pin 410 is guided in a vertical guide groove 107 formed on the side wall 101 of the housing 100 and is moved vertically responsive to the swinging portion of the arm 406. The elevating member 403 is formed with a U-shaped groove 404 and the pin 306 of the cassette tray 300 engages the groove 404. Thus, the cassette tray 300 is moved vertically up or down responsive to the energization of the motor when the pin 408 engages the spiral part 415b of the cam groove 415 on the cam gear 402b.

Figure 5A:
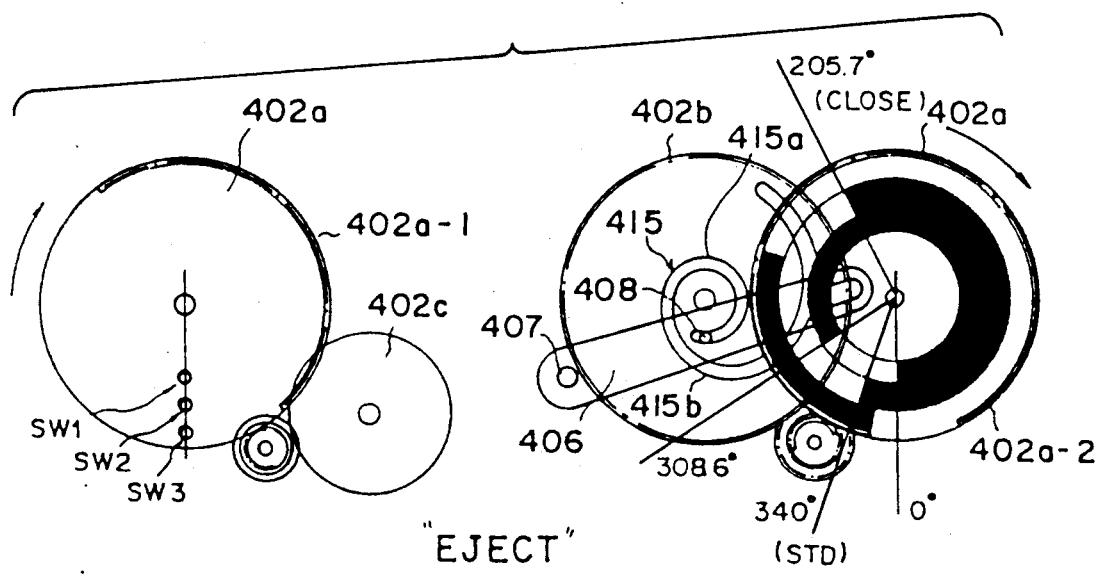
FIGS.5(A)–(D) are diagrams showing a detector used for detection of the position of the cassette tray in FIG.1.
Figure 5B:
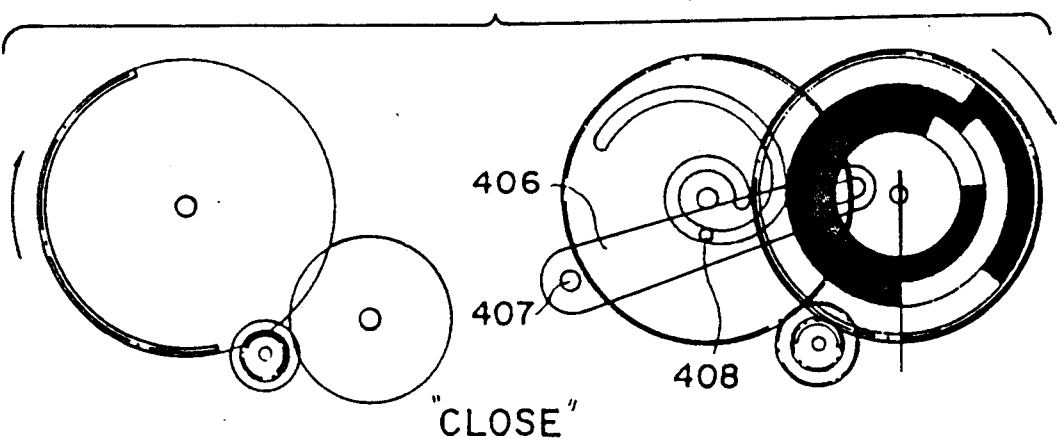
Figure 5C:
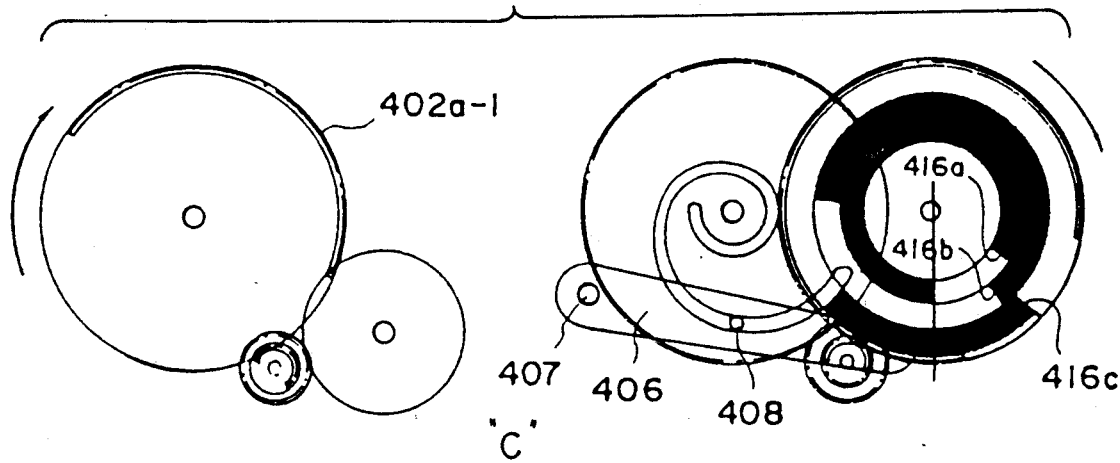

Further, it should be noted that the main gear 402a which drives the gear 402c for movement of the carriage 200 has its teeth 402a-1 (FIGS. 5(A)–(C)) along a limited arc length. Thus, the continuous driving of the carriage 200 after the carriage is moved completely to the CLOSED state in FIG. 3(B) is avoided.

FIG. 4(B) further shows a link mechanism 412 for maintaining the cassette tray horizontal during ascent or descent of the cassette tray 300. The link mechanism 412 comprises a pair of link arms 412a and 412b which cross one another at a center of each of the link arms so as to form an X-shaped configuration. A pin 412c is inserted through the center of each of the link arms so as to rotatably hold the pair of link arms. An end of the link arm 412a is connected to the cassette tray 300 by a pin 300b and the other end of the link arm carries a roller 412e which slidably engages a groove 201a formed on the side frame 201 of the carriage 200. Further an end of the link arm 412b is connected to the side frame 201 by a pin 201b and the other end of the link arm 412b carries a roller 412d which slidably engages a groove 300a formed in the cassette tray 300. Thus, the cassette tray 300 is held horizontally as it is moved in the vertical direction by the arm 406 as illustrated in FIGS. 3(A)–(D).

As the horizontal and vertical movement of the cassette tray 300 is determined by the rotation of the motor 401 and the gear train 402 driven by the motor 401, the state of the tape cassette held on the cassette tray 300 as illustrated in FIGS. 3(A)–(D) can be detected by sensing the angle of rotation of the gear in the gear train 402. For this purpose, a first detector 405 shown schematically in FIG. 2(A) is used. The detector 405 comprises three optical sensors as more clearly seen in FIG. 4(A) and in FIG. 5(A) and are designated as SW1, SW2 and SW3 respectively. The sensors SW1–SW3 are disposed so as to detect the change in the reflection of light at the outer surface of the main gear 402a and the main gear 402a carries on its outer surface a plurality of concentric reflection patterns 416a–416c (FIGS. 5(A)–(C)) as an indication of the state of the cassette tray 300.

Figure 5D:
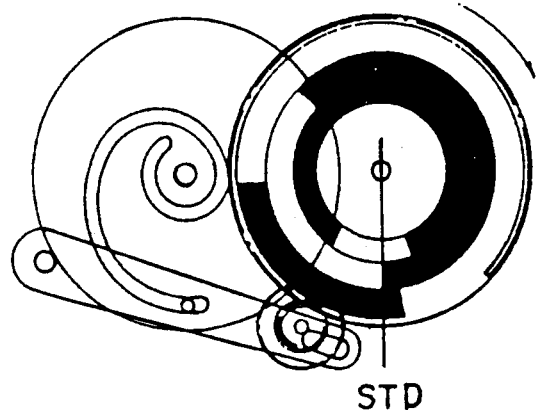
Figure 6:
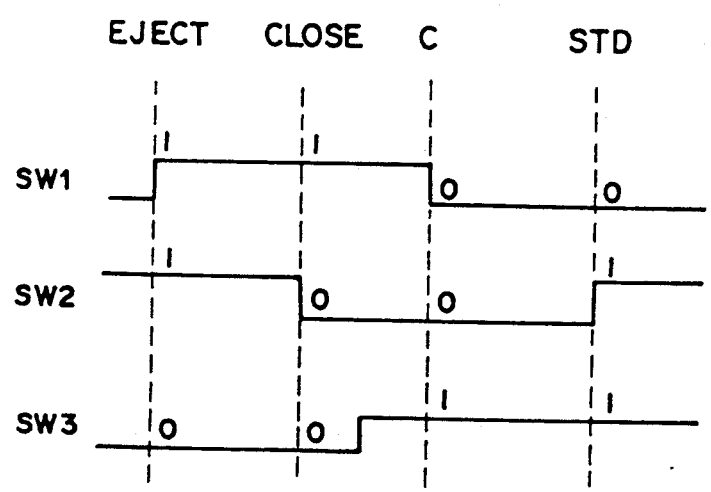
FIG.6 is a diagram showing an output signal of the detector in FIGS.5(A)–(C)

FIGS. 5(A)–(D) show the reflection pattern on the main gear 402a. Referring to the drawing, the sensors SW1–SW3 are aligned vertically on a line extending in the downward direction from the center of the main gear 402a and the reflection patterns 416a–416c are illustrated as black stripes. As can be seen in the drawing, the reflection patterns 416a–416c are a plurality of concentric patterns extending for different arc lengths and the reflection of the pattern 416a is detected by the sensor SW1, the reflection of the pattern 416b is detected by the sensor SW2 and the reflection of the pattern 416c is detected by the sensor SW3. Responsive to the rotation of the main gear 402a, the reflection of light detected by the optical sensors SW1–SW3 changes as shown in FIG. 6 which shows output signals of the sensors SW1–SW3.

FIG. 5(A) represents the EJECT state as defined in FIG. 3(A) in which the cassette tray 300 is fully moved to the front direction. In this state, the arm 406 is swing to a raised position and the pin 408 of the arm engages the concentric part 415a of the cam groove 415. Further the sensors SW1 and SW2 the reflectors 416a and 416b. On the other hand, the sensor SW3 does not oppose the reflector 416c. Thus the output signal from the sensor SW1 assumes a high level state, the output signal from the sensor SW2 assumes a high level state, and the output signal from the sensor SW3 assumes a low level state. As a result, the output signal of the detector 405 is represented by (110). Responsive to the rotation of the motor 401, the main gear 402a is rotated as indicated by the arrow in FIG. 5(A) and the carriage 200 is fully moved in the rear direction as a result of rotation of the gear 402c. Thus, FIG. 5(B) represents the CLOSED state as defined in FIG. 3(B). In FIG. 5(B), the pin 408 of the arm 406 is still engaged with the concentric part 415a of the cam groove 415 and the state of the arm 406 is not changed. In other words, the cassette tray is still at the same level as the level in the EJECt state. However, the reflection patterns 416a–416c are rotated together with the rotation of the main gear 402a and the sensor SW1 alone detects the reflection. Thus, the output signal of the sensor SW1 is high, the output signal of the sensor SW2 is low, and the output signal of the sensor SW3 is low as shown in FIG. 6. In other words, the output signal of the detector 405 is represented by (100) in the CLOSED state. Responsive to the further rotation of the motor 401, the main gear 402 is rotated further. However, as the main gear has the teeth $402_{a-1}$ for engagement with the gear 402c for a limited arc length or angular distance, the gear 402c for driving the carriage 200 is not rotated further. On the other hand, the pin 408 on the arm 406 engages the spiral part 415b of the cam groove 415 and the arm 406 is swung in the downward direction with the rotation of the main gear 402a as shown in FIG. 5(C). Thus, the cassette tray 300 reaches the C state as defined in FIG. 3(C) for the loading of the compact size tape cassette. Responsive to the rotation of the main gear 402a, the position of the reflection patterns is also changed. Thus the sensors SW1 and SW2 produce low level output signals while the sensor SW3 produces a high level output signal as shown in FIG. 6. In other words, the detector 405 produces an output signal (001) when the cassette tray 300 is in the C state. REsponsive to the further rotation of the main gear 402a, the arm 408 is further lowered and the state shown in FIG. 5(D) is reached. In this state, the cassette tray 300 is fully lowered. Thus, FIG .5(D) shown the STD state as defined in FIG. 3(D). Responsive to the rotation of the main gear 402a, the reflection patterns 416a–416c are also rotated and the sensors SW1, SW2 and SW3 produce output signals as indicated by STD in FIG. 6. In other words, the detector 405 produces an output signal (011) when the cassette tray 300 is in the STD state.

Next, a reel drive mechanism used in the tape cassette loading system for driving the take up reel and supply reel of the tape cassette will be described. As the level of the cassette tray 300 differs between the C state and the STD STATE, it is necessary to change the level of the reel drive mechanism responsive to the level of the cassette tray such that the reel drive mechanism assumes an UP state when the cassette tray is in the C state and a DOWN state when the cassette tray is in the STD state.

Referring to FIG. 7(A), the reel drive mechanism comprises a main chassis 500 fixed to the housing 100 of the tape cassette loading system. The main chassis carries positioning pins 501a and 501b for positioning the standard size tape cassette in the STD state, level reference pins 502a and 502b for determining the level of the standard size tape cassette in the STD state, a pin 503 for releasing the rake of the reels in the standard size tape cassette in the STD state, and a supply reel disk 504 and a take up reel disk 505 for driving the supply reel and the take up reel of the standard tape cassette held in the STD state by the cassette tray 300. In the STD state, the pins 501a and 501b enter the cutout 303 of the cassette tray 300 and engage positioning depressions 2a and 2b formed on the bottom of the standard size tape cassette 2 on the cassette tray 300 (FIG.1(A)), the pins 502a and 502b penetrate the cassette tray 300 through corresponding holes 310a and 310b (FIG.2(A)) and support the bottom of the standard size tape cassette at a predetermined level, and the pin 503 penetrates the cassette tray 300 through a corresponding hole 310c and engages a hole 2f (FIG.1(A)) for accepting a pin for releasing the brake of the reels. Further, the reel disks 504 and 505 are accepted in the openings 304 and 305 of the cassette tray 300 when the cassette tray 300 is lowered from the CLOSED state to the STD state. Thus, the main chassis 500 is disposed on the housing 100 at a position immediately below the cassette tray 300 when the cassette tray 300 is in the CLOSED state from which the cassette tray is vertically lowered to the C state and to the S state.

Referring to FIG.7(A) again, the reel drive mechanism further comprises a sub-chassis 600 provided below the main chassis 500 in a manner movable up and down relative to the main chassis 500. The sub-chassis 600 carries positioning pins 601a and 601b for positioning the compact size tape cassette in the C state, and level reference pins 602a and 602b for determining the level of the compact size tape cassette in the C state. In the C state, the sub-chassis is moved to the UP state and the pins 601a and 601b penetrate through corresponding holes 311a and 311b (FIG.2(A)) in the cassette tray 300 and engage depressions 7a and 7b (FIG.1(B)) formed on the bottom of the compact size tape cassette 7 on the cassette tray 300. Further, the sub-chassis 600 carries a drive gear 603 having a toothed lower flange 603a which engages with a toothed part of the take up reel disk 505 on the main chassis 500 when the sub-chassis 600 is in the UP state and further having a toothed upper flange 603b for engagement with the toothed take up reel (not shown) of the compact size tape cassette 3 when the sub-chassis 600 is in the UP state. In order to allow the engagement of the pins 601a, 601b, 602a and 602b and the gear 603 on the sub-chassis 600 which in turn is located below the main chassis 500, with the compact size tape cassette 3, the main chassis 500 is further provided with cutouts 506a and 506b as shown in FIG.7(A).

Next, the mechanism for moving the sub-chassis 600 up and down will be described. Referring to FIGS.7(B) and (C), the sub-chassis 600 is carried at an end of a pair of generally L-shaped arms 604 which are swung up and down around their respective central parts by a rotary shaft 606. As will be described in detail with reference to FIG.8(B), the rotary shaft 606 is driven by a drive mechanism mounted on the main chassis 500. As can be seen in FIG.7(B), a pair of such L-shaped arms 604 are used with the other end of the arms 604 being connected by a connecting rod 605 so that the arms 604 are moved uniformly with respect to one another and the sub-chassis 600 is held horizontal during the up/-down movement between the UP state and the DOWN state. In FIG.7(B), the arm 604 is in its raised state and the sub-chassis 600 is in the UP state for supporting and driving the compact size tape cassette 3. In other words, the UP state in FIG.7(B) corresponds to the C state in FIG.3(C). In FIG.7(C), on the other hand, the arm 604 is in its lowered state and the sub-chassis 600 is in the DOWN state for supporting and driving the standard size tape cassette 1. Thus, the DOWN state in FIG.7(C) corresponds to the STD state in FIG.3(D).

Figure 8A:
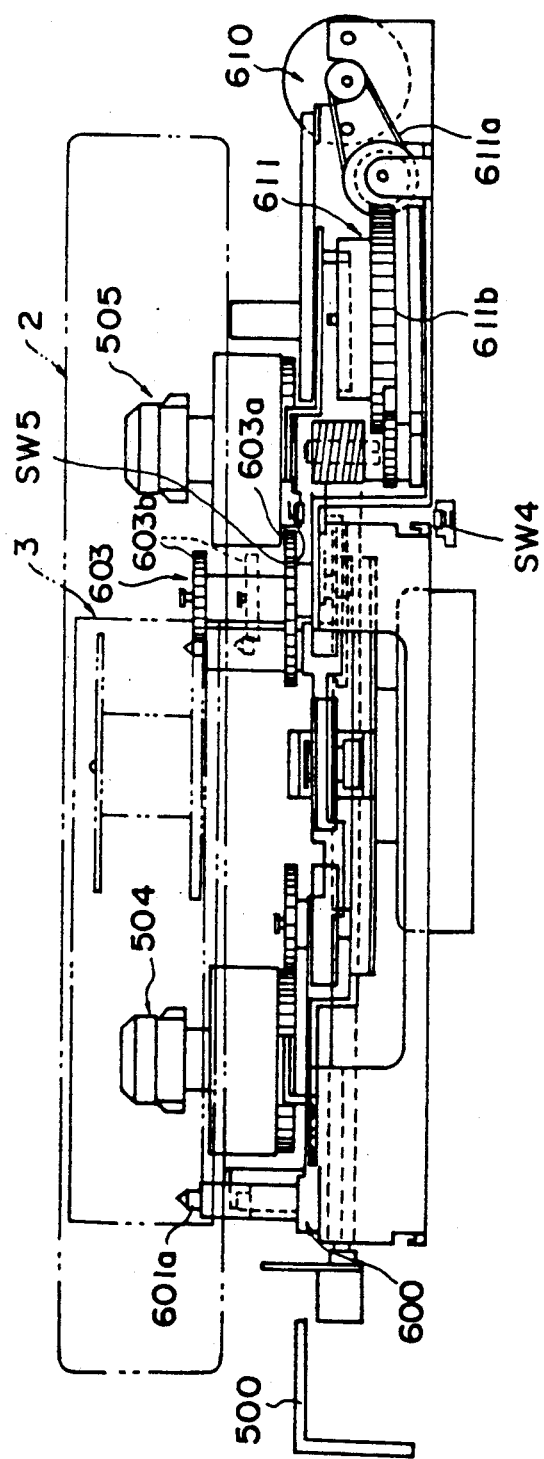
FIGS.8(A)–(D) are diagrams showing an up/down mechanism for raising and lowering the sub-chassis in FIG.7(A)–(C)
Figure 8:
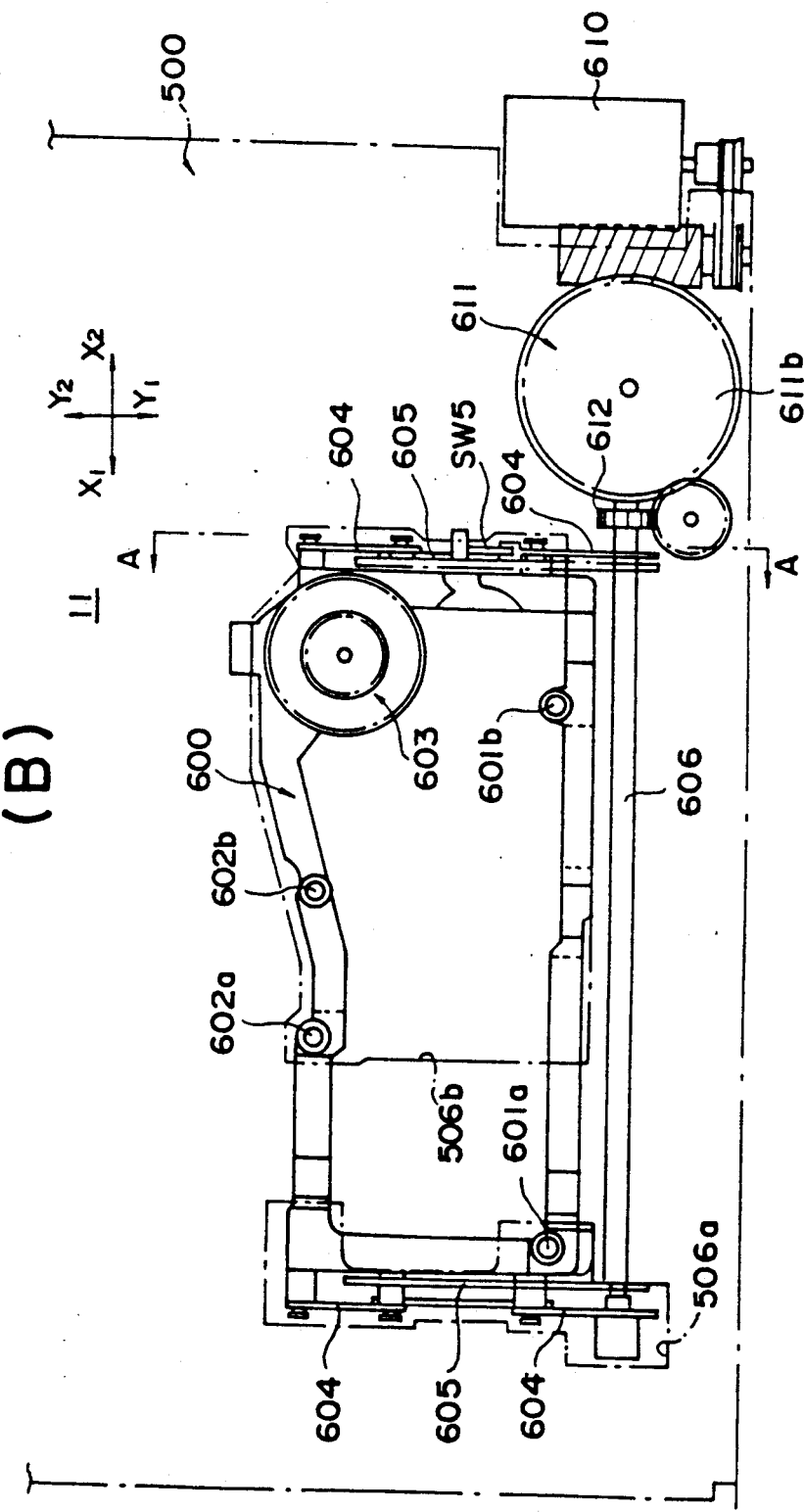
Figure 8:
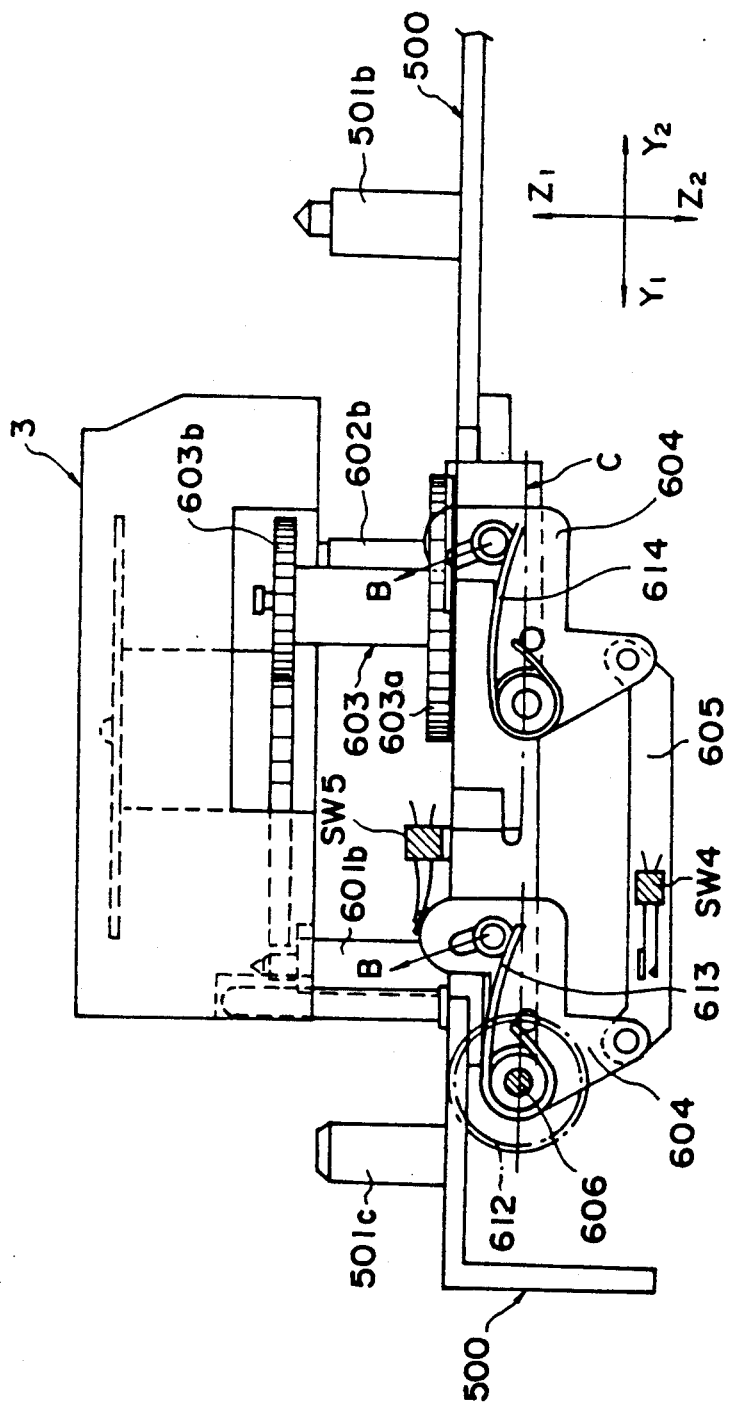

FIGS.8(A) and (B) show the details of the drive mechanism used for driving the rotary shaft 606 so as to move the sub-chassis 600 up and down. The mechanism comprises a drive motor 610 and a gear train 611 driven by the motor 610. The gear train 611 comprises a belt and pulley mechanism 611a and a gear system 611b driven by the mechanism 611a, and drives a gear 612

(FIG.8(B)) provided at an end of the rotary shaft 606. Further, a pair of switches SW4 and SW5 are provided so as to detect the state of the sub-chassis 600. The switches SW4 and SW5 are more clearly illustrated in FIGS.8(C) and (D). The switch SW4 is fixed at a predetermined level relative to the main chassis 500 so that the switch SW4 is closed when the arm 604 is swung to the lowered state as shown in FIG.8(C) and so that the switch SW4 is opened when the arm 604 is swung to the raised state as shown in FIG.8(D). In other words, the switch SW4 is closed when the sub-chassis 600 is in the DOWN state. The switch SW5 on the other hand is fixed on the main chassis 500 and is closed when the arm 604 is swung to the raised state as shown in FIG.8(D) and is opened when the arm 604 is swung to the lowered state as shown in FIG.8(C). In other words, the switch SW5 is closed when the sub-chassis 600 is in the UP state.

Figure 9:
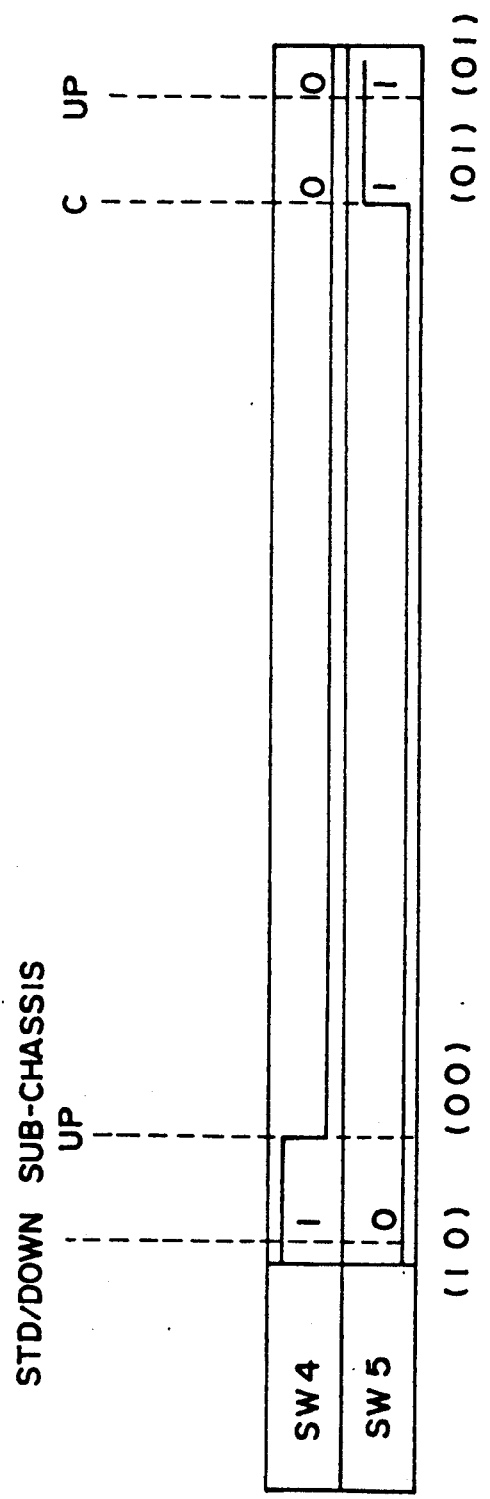
FIG.9 is a diagram showing an output signal of detector switches used in the up/down mechanism in FIGS.8(A)–(C)

FIG.9 shows the output signal of the switches SW4 and SW5. When the cassette tray 300 is in the STD state and the sub-chassis 600 is in the DOWN position, the switch SW4 is closed and the switch SW5 is opened. This state may be represented by the output signals of the switches SW4 and SW5 as (10) as shown in the drawing. When the motor 610 is energized and the sub-chassis 600 is raised, the switch SW4 is opened first and the state of the switches SW4 and SW5 is represented by the output signals as (00). As the motor 610 continues to be energized, the sub-chassis 600 is moved to the UP state where the switch SW4 is now closed. This state is represented as (01) as in the drawing. Thus, the state of the sub-chassis 600 is discriminated by the output signals of the switches SW4 and SW5. As described previously, the UP state of the sub-chassis 600 corresponds to the C state of the cassette tray 300 defined in FIG.3(C) and the DOWN state of the sub-chassis 600 corresponds to the STD state of the cassette tray 300 defined in FIG.3(D). In order that the sub-chassis 600 assumes its UP state when the cassette tray 300 is in the C state and its DOWN state when the cassette tray 300 is in the STD state, it is necessary to coordinate the operation of the motor 401 for the cassette tray 300 and the motor 610 for the subchassis 600. For this purpose, a controller to be described later is used. The states of the switches SW1–SW3 in FIG.6 and the states of the switches SW4 and SW5 are used in the controller for detection of the state of the cassette tray 300 and the sub-chassis 600 as will be described later.

Figure 10:
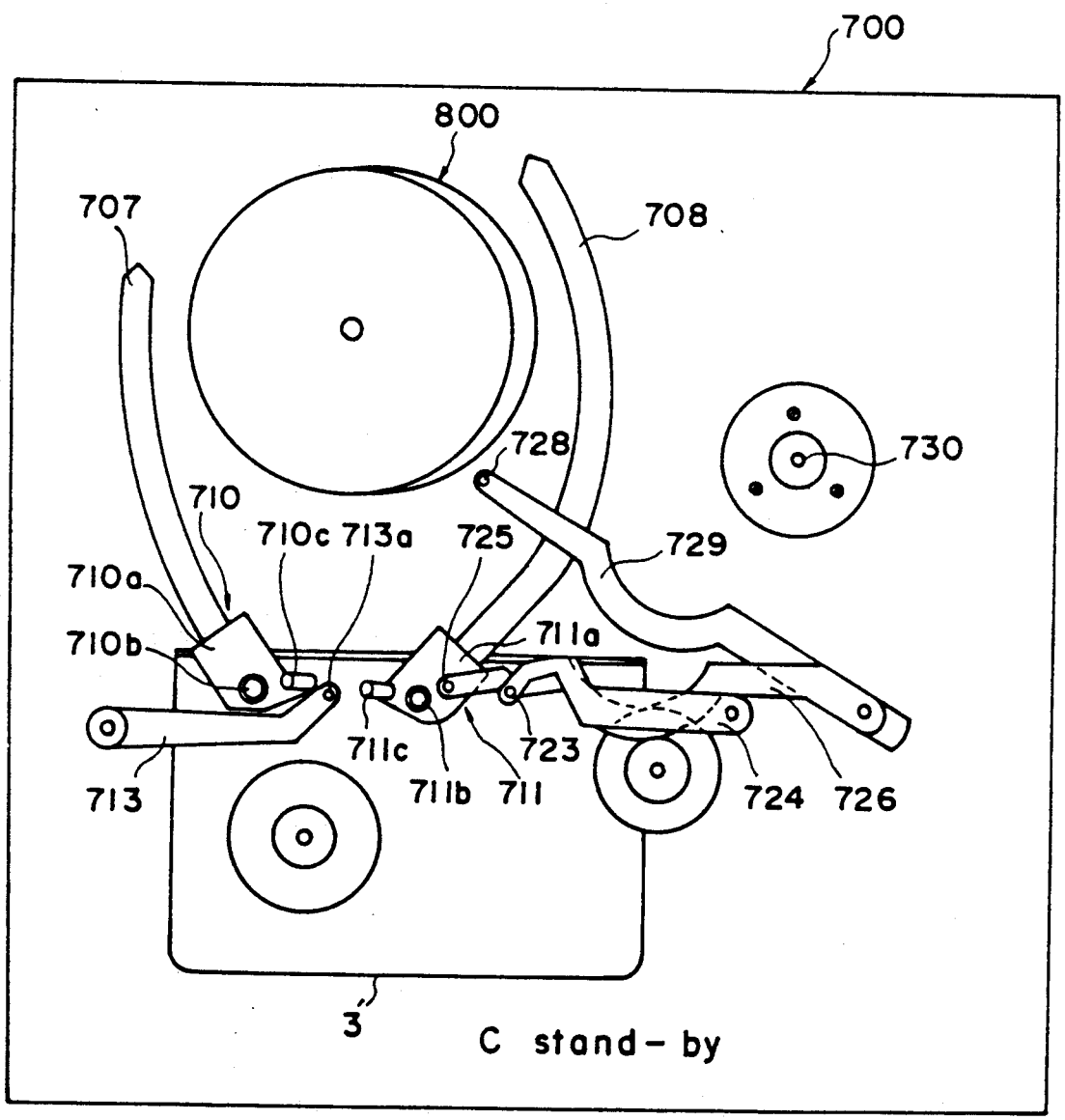
FIG.10 is a plan view showing a tape loading mechanism for drawing out a magnetic tape from the tape cassette and for wrapping the magnetic tape around a guide drum in a first ready-for-loading state for the compact size tape cassette.
Figure 11:
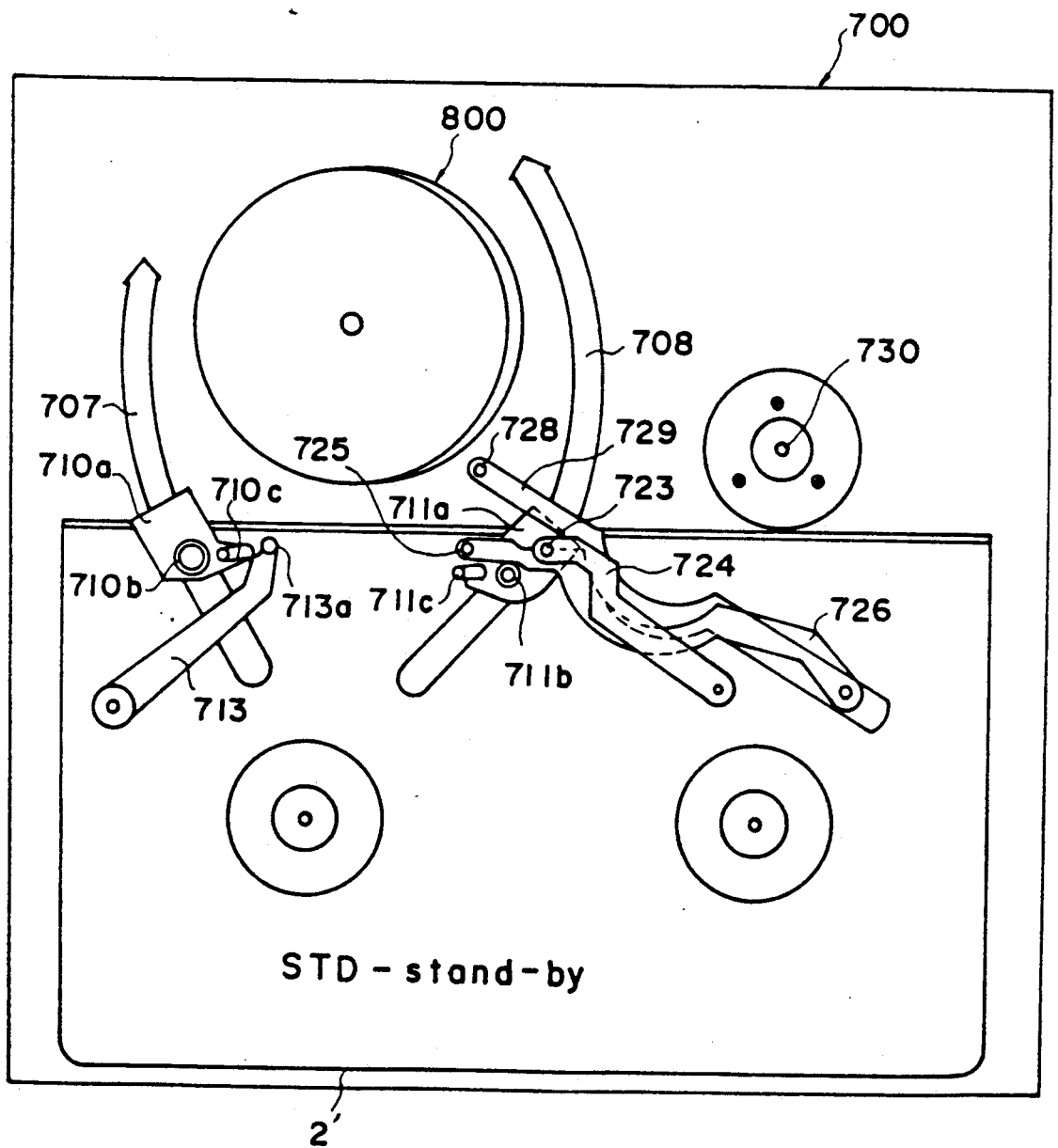
FIG.11 is a plan view similar to FIG.10 showing the tape loading mechanism in a second ready-for-loading state for the standard size tape cassette.
Figure 12:
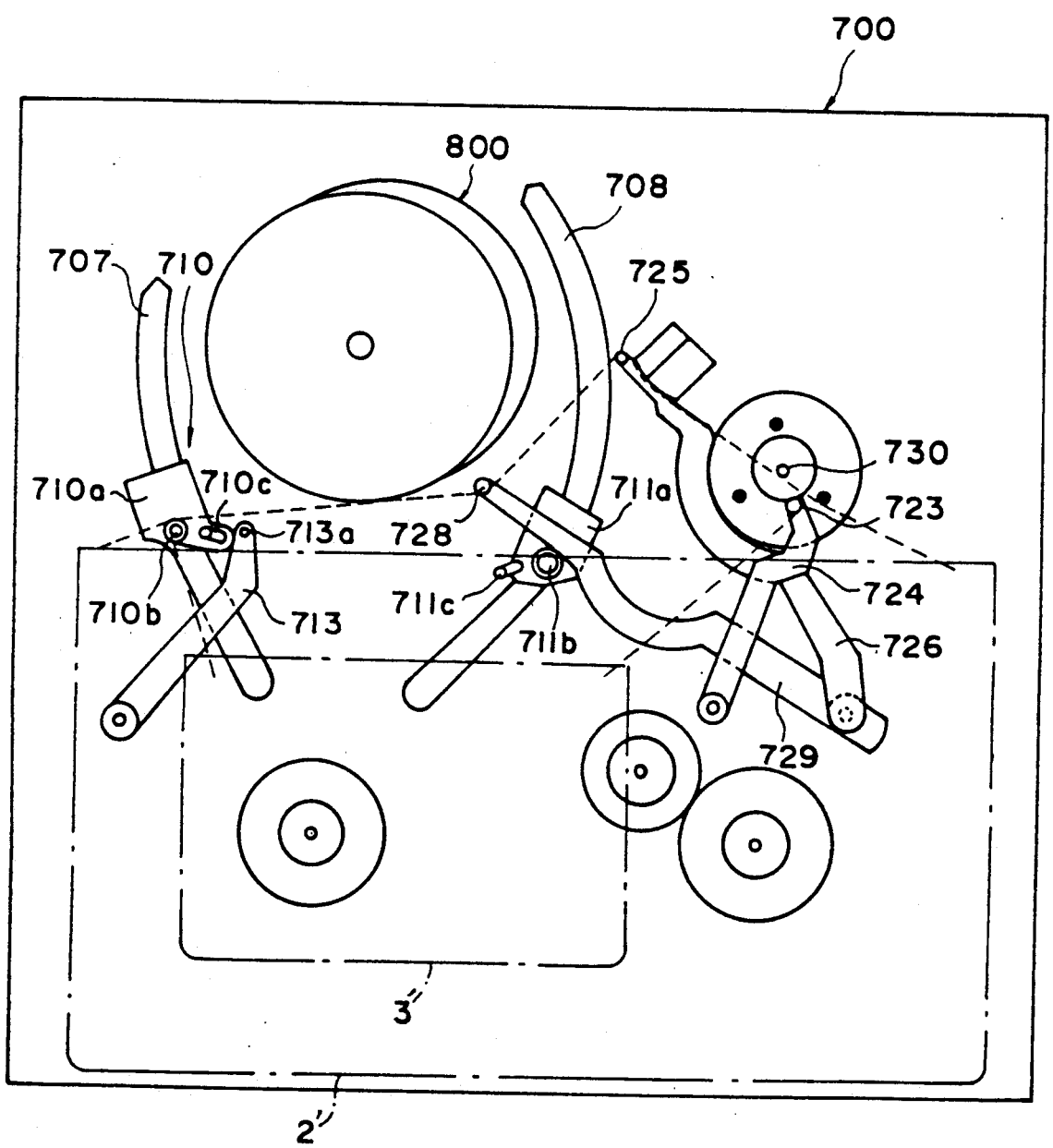
FIGS.12(A) and (B) are plan views similar to FIG.11 showing the tape loading mechanism in a half loading state.
Figure 12:
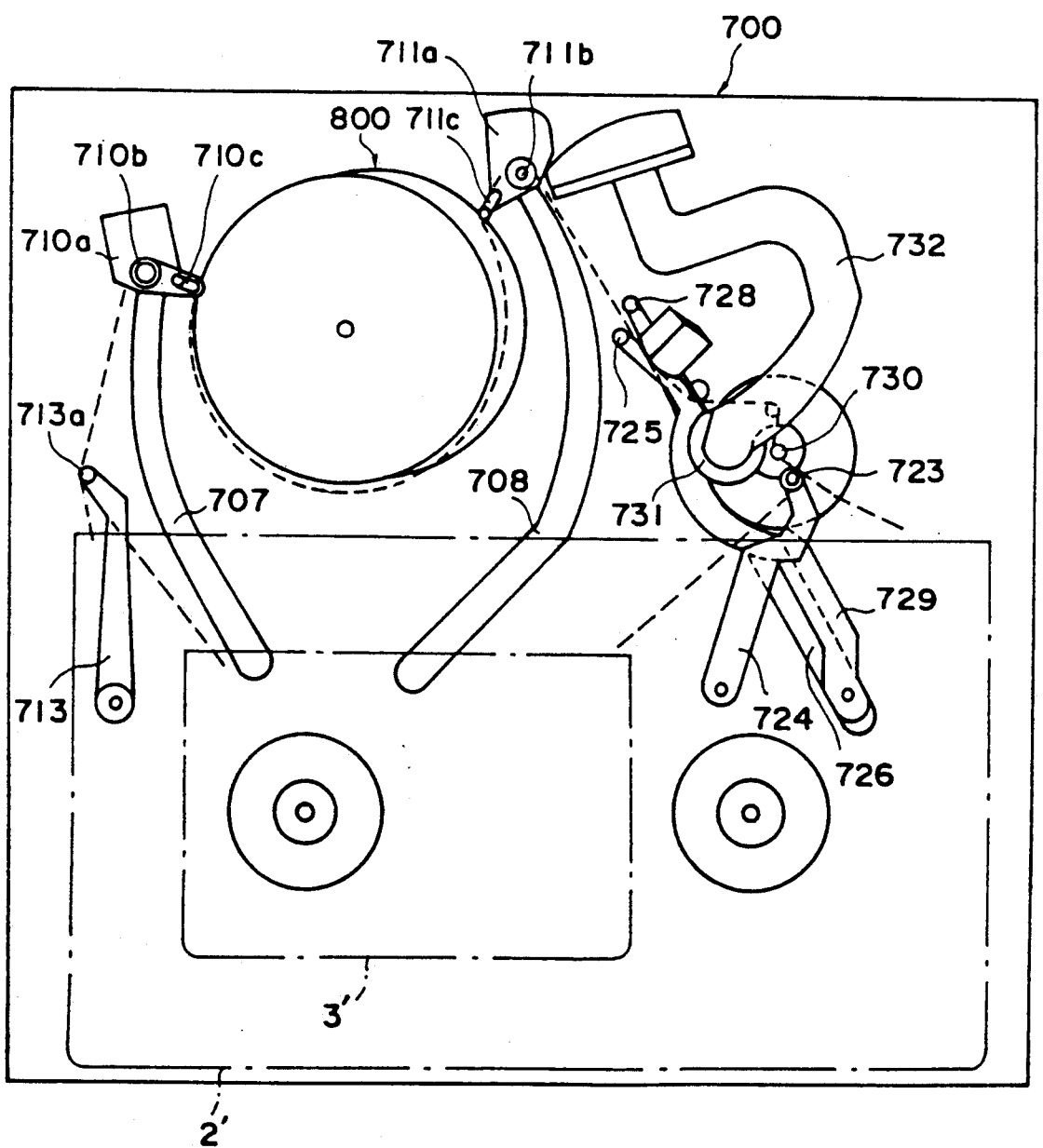

Next, the tape loading mechanism used in the tape cassette loading system of the present invention will be described. At first, the general operation of the tape loading mechanism will be described with reference to FIGS.10–12. The detailed structure of the tape loading mechanism and the driving mechanism for driving the tape loading mechanism will be described later with reference to FIGS.13–24. Referring to FIGS.10–12, the tape loading mechanism comprises a chassis 700 on which a guide drum 800 is carried rotatably. Further, the projection of the standard size tape cassette 2 and the compact size tape cassette 3 cast on the chassis 700 when these tape cassettes 2 and 3 are in the STD state and in the C state is represented in the drawings by reference numerals 2' and 3', respectively. As usual, the guide drum 800 carries a plurality of magnetic heads (not shown) thereon. Further, the chassis 700 is formed with a pair of guide grooves 707 and 708 respectively at the left and right of the guide drum 800. It should be noted that the guide groove 708 is slightly longer than the guide groove 707. The tape loading mechanism further comprises a pair of loading members 710 and 711 respectively guided along the guide grooves 707 and 708, and the loading member 710 at the left of the guide drum 800 comprises a base member 710a engaged with the guide groove 707 and carrying a guide roller 710b and an oblique pole 710c which are used for wrapping the magnetic tape around the guide drum 800. Similarly, the loading member 711 at the right of the guide drum 800 comprises a base member 711a engaged with the guide groove 708 and carrying a guide roller 711b and an oblique pole 711c for wrapping the magnetic tape around the guide drum 800. As will be seen in FIGS.12(A) and (B), the guide roller 710b is used also for drawing out the magnetic tape from the tape cassette held on the cassette tray in the aforementioned STD state or the C state Further, the tape loading mechanism comprises a pole 723 at an end of a swing arm 724, a pole 725 at an end of a swing arm 726, a pole 728 at an end of a swing arm 729, and a pole 713a at an end of a swing arm 713. As can be seen in FIG. 12(A), the pole 725 is used to draw out the magnetic tape shown by a broken line in FIG.12(A) from the standard size tape cassette 2 and the poles 723 and 725 are used to draw out the magnetic tape from the compact size tape cassette 3. The pole 728 at the end of arm 729 is used to prevent the magnetic tape from being fully wrapped around the guide drum in a so called "HALF LOADING state" to be described with reference to FIG.12(A). The pole 713a at the end of the pole 713 is a member for applying tension to the magnetic tape during the recording and reproducing operation of the magnetic recording and reproducing apparatus.

It should be noted that FIG.10 shows a state in which the loading members 710 and 711 are located at an end of the guide grooves 707 and 708 away from the guide drum 800 or close to the tape cassette 3 and the swing arms 724 and 726 are fully rotated in the counterclockwise direction. Further, the arm 713 at the left is fully rotated or swung in the clockwise direction. In this state, the guide roller 710b, the oblique pole 710c and the pole 713a are accepted in the cutout portion 3f at the front side of the compact size tape cassette 3, the guide roller 711b, the oblique pole 711c and the pole 725 are accepted in the cutout portion 3g of the tape cassette 3, and the guide pole 723 is accepted in the cutout portion 3h of the tape cassette 3, when the compact size tape cassette is placed on the cassette tray 300 in the C state shown in FIG.3(C). In this state, the magnetic tape contained in the compact size tape cassette is ready for loading on the guide drum 800 carrying the magnetic heads. This state will be referred to hereinafter as a C STAND-BY state. It should be noted that the guide grooves 707 and 708 are extended towards the tape cassette 3 as compared to the corresponding grooves in the prior art tape loading mechanism designed exclusively for loading the magnetic tape in the standard size tape cassette.

FIG.11 shows another state in which the loading members 710 and 711 are moved along the guide grooves 707 and 708 slightly in the direction of the guide drum 800. Similarly, the arms 724 and 726 at the right are slightly rotated in the clockwise direction and the arm, 713 at the left is slightly rotated in the counterclockwise direction. In this state, the guide roller 710b, the oblique pole 710c and the pole 713a are accepted in the cutout portion 2g of the standard size tape cassette 2 and the guide roller 711b, the oblique pole 711c and the poles 723 and 725 are accepted in the cutout portion 2h of the tape cassette 2 when the tape cassette 2 is placed on the cassette tray 300 and is moved to the STD state shown in FIG.3(D). In this state, the magnetic tape in the standard size tape cassette is ready for loading on the guide drum 800. Thus, this state will be referred to hereinafter as a STD STAND-BY state.

FIG.12(A) shows another state of the tape loading mechanism in which the tape loading members 710 and 711 are moved further towards the guide drum 800 and the arms 724 and 725 are swung further in the clockwise direction. At the same time, the arm 713 carrying the pin 713b is swung in the counter clockwise direction. In this state, the magnetic tape shown by the broken line in the drawing is drawn out from the standard size tape cassette 2 by the guide roller 710b on the loading member 710 and by the pin 725 carried by the arm 726. When the compact size tape cassette 3 is held on the cassette tray 300 in the C state, the pin 723 carried by the arm 724 is used also for drawing out the magnetic tape from the tape cassette 3 in addition to the pin 725 on the arm 726. In the state of the tape loading mechanism shown in FIG.12(A), the magnetic tape is prevented from being wrapped around the guide drum 800 by the pin 728 carried by the arm 729. Thus, the magnetic tape drawn out from the tape cassette 2 or 3 makes a tangential contact with the guide drum 800. This state is used for fast transport of the magnetic tape or rewind of the magnetic tape and will be referred to hereinafter as a HALF LOADING state.

Figure 3:
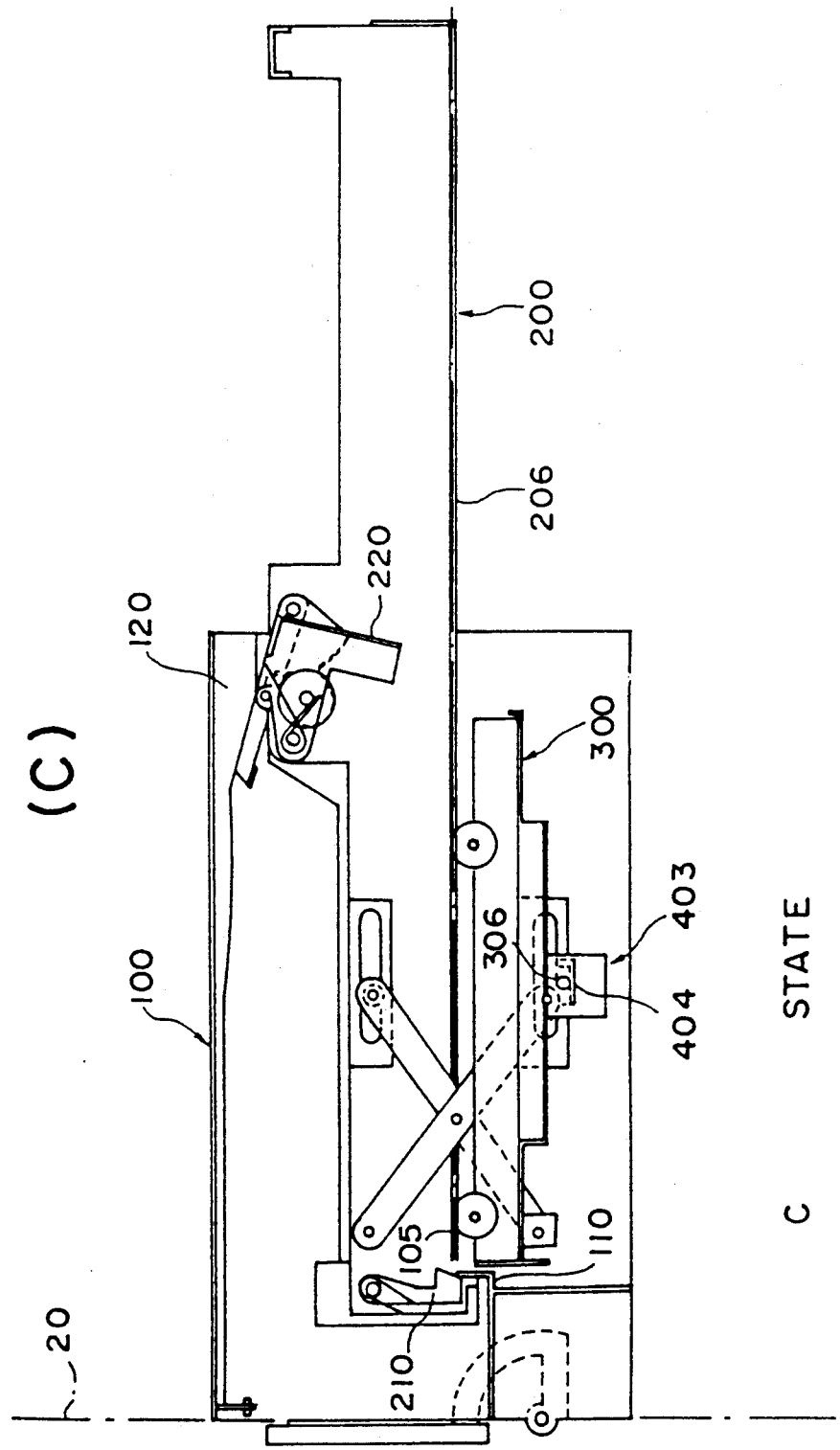

FIG.12(B) shows another state in which the loading members 710 and 711 are fully moved in the direction of the guide drum 800 and the magnetic tape drawn out from the tape cassette 2 or 3 is fully wrapped around the guide drum 800 as shown by the broken line in the drawing. Thus, this state will be referred to hereinafter as a FULL LOADING state. In this state, the arms 724, 726 and 729 are fully swung in the clockwise direction and the pins 725 and 728 carried by the arms 726 and 729 are disengaged from a path of the magnetic tape. Further, as shown in FIG.3, a pinch roller 731 carried by an arm 732 is moved such that the magnetic tape is held between the pinch roller 731 and a capstan 730 and the magnetic tape is driven by the capstan 730 at a predetermined speed. Further, it should be noted that the arm 713 carrying the pin 713a at its end is fully rotated in the counter clockwise direction and the magnetic tape is pushed by the pin 713a in the left direction. Thus, the slackening of the magnetic tape is eliminated regardless of whether the magnetic tape is drawn out from the standard size tape cassette 2 or from the compact size tape cassette 3.

Figure 13:
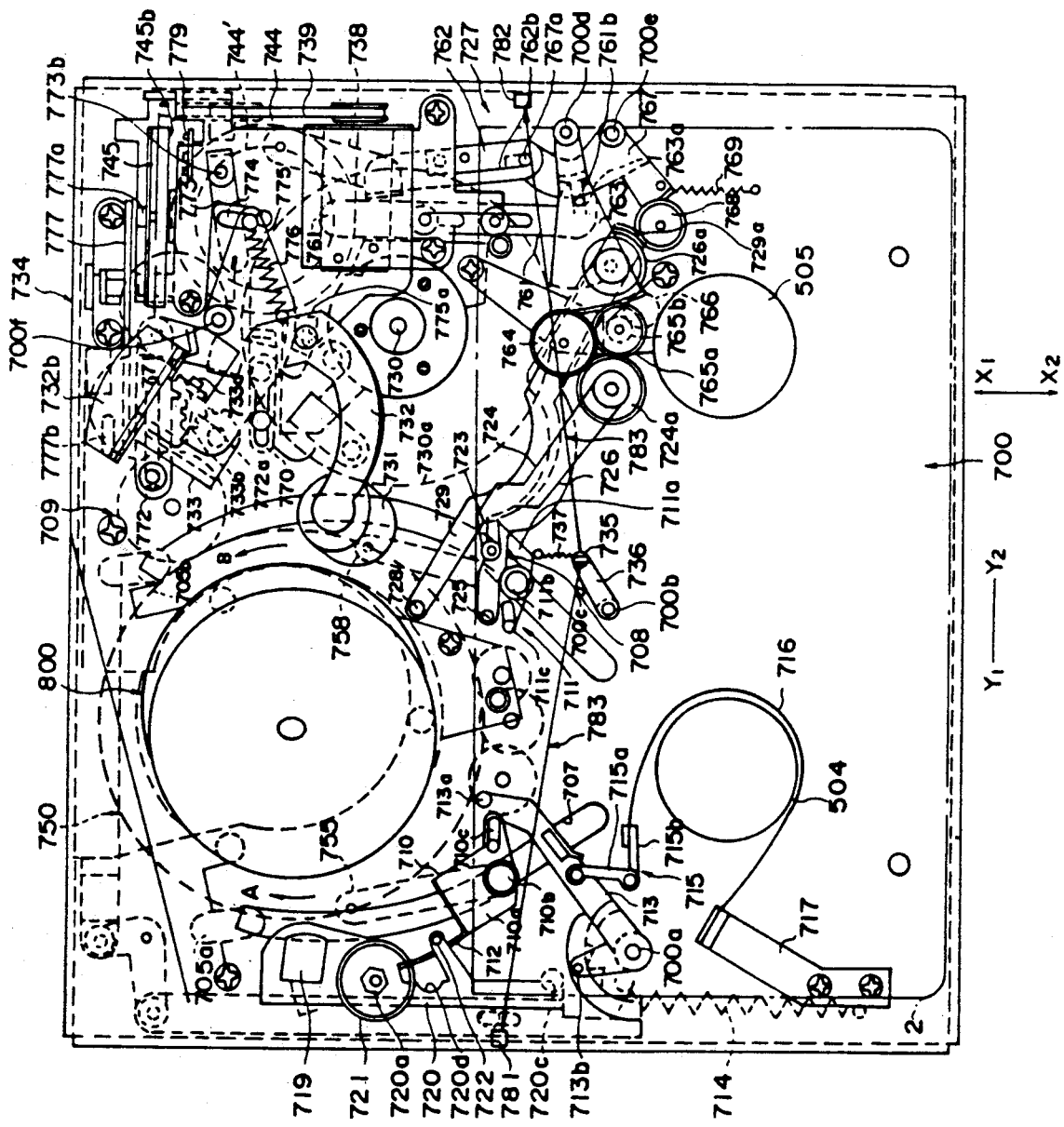
FIG.13 is a plan view showing in detail the tape loading mechanism shown in FIG.10.

Next, a part of the tape loading mechanism not shown in FIGS.10-12 will be described with reference to FIGS.13-16. In FIG.13, it can be seen that the tape loading mechanism assumes a state corresponding to the state shown in FIG.11. In other words, FIG.13 shows the mechanism for driving the tape loading mechanism in the STD STAND-BY state. Similarly, FIG.16(A) shows the mechanism in the C STAND-BY state.

Referring to FIG.13, the arm 713 carrying the pole 713a at its end is held rotatably on the chassis 700 by a pin 700a. The arm 713 has a branched arm 713b and an end of a spring 714 (shown by a broken line in the drawing) having another end fixed to the chassis 700 is connected to the branched arm 713b such that the arm 713 is urged in the counter clockwise direction as a result of the urging force exerted by the spring 714. Thus, the arm 713 the tape loading member 710 when the tape loading member is located in a range swept by the arm 713 when the arm is rotated around the pin 700a. It should be noted that the arm 713 is rotated responsive to the movement of the base member 710a as a result of the urging by the spring 714.

Figure 24:
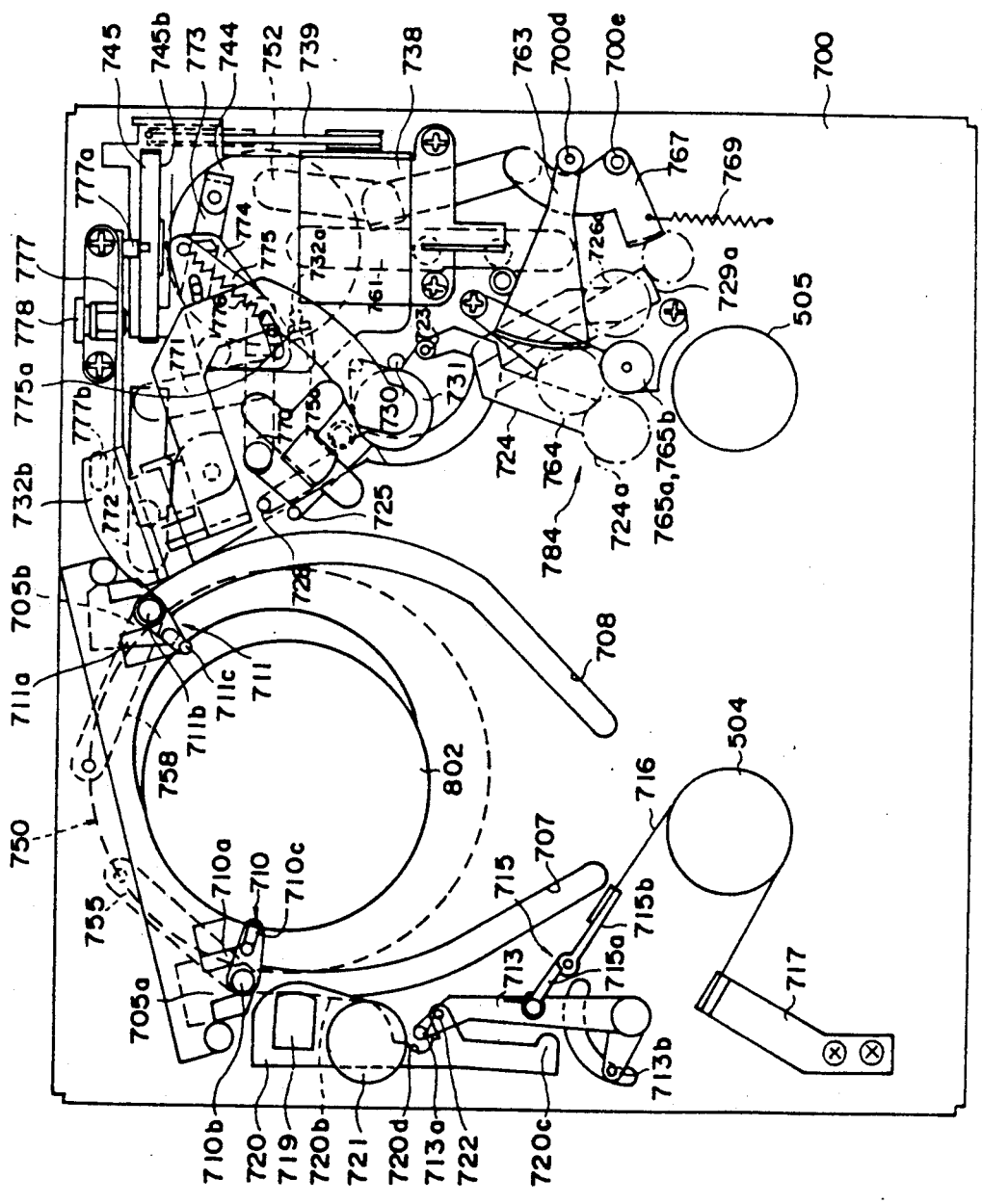
FIG.24 is a plan view showing the details of the tape loading mechanism in the fully loaded state.

The arm 713 further carries an end of a leg 715a of a toggle member 715. The toggle member 715 is a generally L-shaped member comprising a first leg 715a and a second leg 715b. The legs 715a and 715b are connected rotatably and the end of the leg 715a is connected to the arm 713 as already described. At an end of the leg 715b, there is connected an end of a brake band 716. The brake band 716 has its another end connected to a member 717 fixed on the chassis 700 and is provided along a periphery of the reel disk 504 for driving the supply reel of the tape cassette. As can be seen in FIG.16(A), the toggle member 715 is freely deformable in a direction so as to reduce the angle between the legs 715a and 715b. However, the toggle member 715 is prevented from deformation when the angle between the legs 715a and 715b is increased beyond 180 degrees as shown in FIG.24. Thus, the toggle member 715 is deformed such that the angle between the legs 715a and 715b is increased in the HALF LOADING state or in the FULL LOADING state responsive to the counter-clockwise rotation of the arm 713 and is decreased in the STD STAND-BY state shown in FIG.13 or further decreased in the C STAND-BY state in FIG.16(A) responsive to the clockwise rotation of the arm 713 and the excessive slackening of the brake band 716 is eliminated. In order to decrease the angle between the legs 715a and 715b of the toggle member 715 responsive to the clockwise rotation of the arm 713, the brake band 716 is provided with a weak rigidity such that the toggle member 715 is folded responsive to such movement of the arm 713 as a result of the force exerted by the rigidity of the brake band 716.

FIG.13 further shows an erasing head 719 fixed on a base member 720 which in turn is supported on the chassis 700 rotatably around a pin 720a. The base member 720 further carries on its upper surface an impedance roller 721 and a guide pole 722.

Furthermore, FIG.13 shows a light emitting element 735 used for detecting the end of the magnetic tape. The element 735 is provided at an end of an arm 736 held rotatably around a shaft 700b on the chassis 700 which in turn is urged in the counter-clockwise direction by a force exerted by a spring 737. In a normal state, the arm 736 contacts a pin 700c projecting upwards from the chassis 700 and the light emitting element 735 is located at a position corresponding to the opening 2f provided on the standard size tape cassette 2. When the compact size tape cassette 3 is loaded, the arm 736 is displaced by the arm 724 which is rotated in the counter-clockwise direction and the light emitting element 735 is shifted to a position corresponding to the cutout portion 3h of the compact size tape cassette 3. In order to receive the light emitted from the light emitting element 735, a pair of photo sensors 781 and 782 are provided at both sides of the tape loading mechanism so as to receive the light from the element 735 when the magnetic tape has reached its end. As is usually practiced in the art, a transparent lead tape is connected to the end of the magnetic tape in the tape cassette 2 or 3 so that the light from the light emitting element 735 is received at the photo sensors 781 and 782. In FIG.13, the path of the light from the element 735 to the photo sensors 781 and 782 is indicated by a line 783.

Next, mechanisms for driving each part of the tape loading mechanism will be described.

1) Loading Member Drive Mechanism

Figure 14:
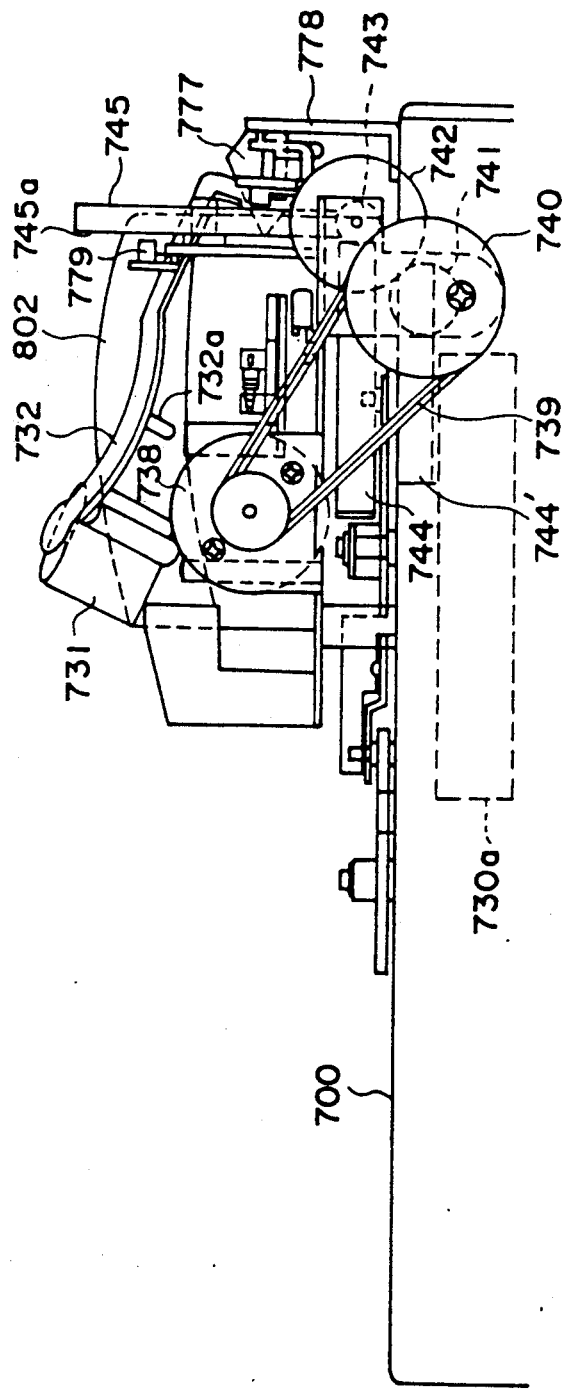
FIG.14 is a side view showing a drive mechanism for driving the tape loading mechanism.

The loading member drive mechanism is a mechanism used to move the loading members 710 and 711 as well as the pins and guide rollers carried thereon along the guide grooves 707 and 708. Referring to FIGS.13 and 14, the loading member drive mechanism comprises a motor 738, a belt 739 driven by the motor 738, and a pulley 740 driven by the belt 739. The pulley 740 carries thereon a gear 741 formed unitarily with the pulley 740, and the rotation of the gear 741 is transmitted to a worm gear 743 via a gear 742 meshing with the gear 741. FIG.14 is a side view showing the aforementioned part of the loading member drive mechanism. It can be seen that a horizontal main cam gear 744 rotating in a horizontal plane and a vertical sub-cam gear 745 rotating in a vertical plane are meshed with the worm gear 743 horizontally and vertically. Thus, responsive to the rotation of the worm gear 743, the main cam gear 744 and the sub-cam gear 745 are rotated.

Figure 15:
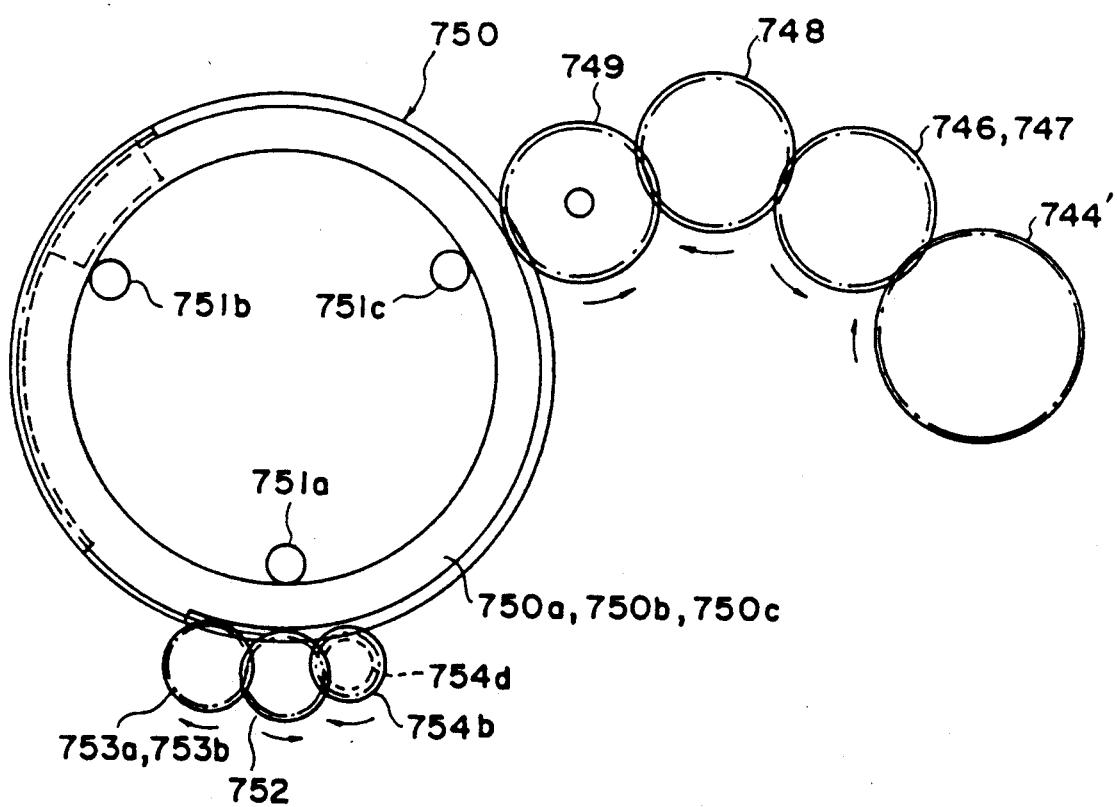
FIG.15 is a diagram showing a gear system used to drive the tape loading mechanism.
Figure 16:
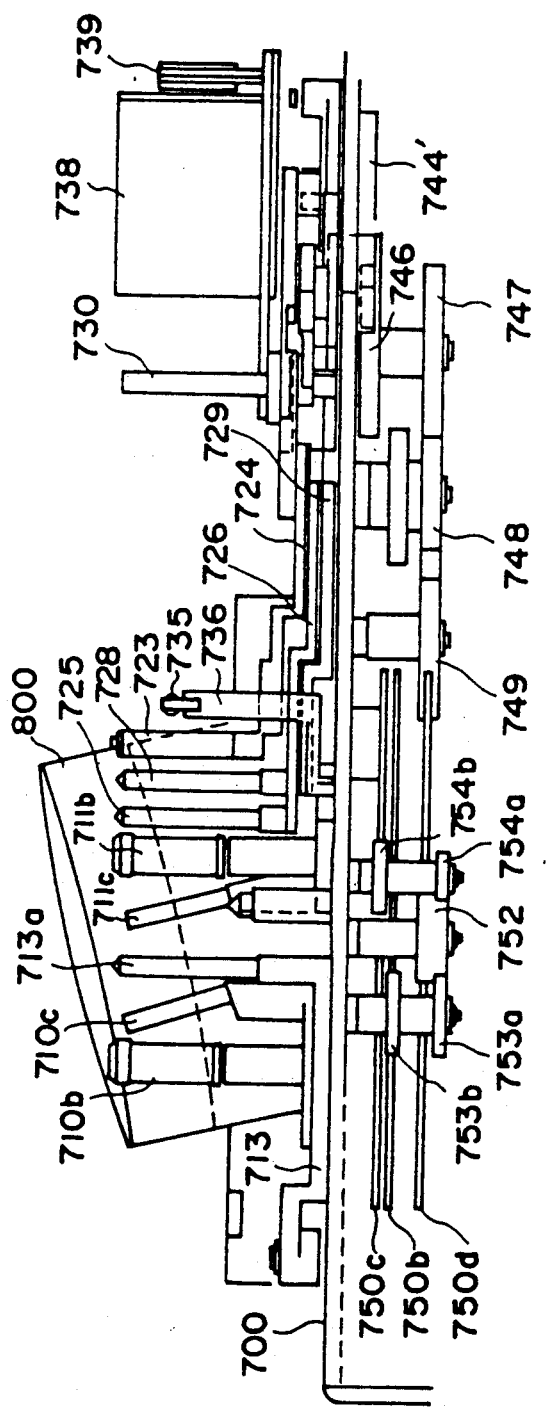
FIGS.16 (A) and (B) are a plan view and a side view showing the drive mechanism for driving the tape loading mechanism.

FIG.15 shows a gear system for transmitting the rotation of the main cam gear 744 to a ring gear system 750 which is used to move the loading members 710 and 711. Thus, the rotation of the main cam gear 744 is transmitted to a main gear 744' which is made integral with the main cam gear 744, and the rotation of the main gear 744' is transmitted to the ring gear system via gears 746, 747, 748 and 749. The ring gear 750 is provided immediately below the guide drum 800 and comprises a ring-shaped gear 750a driven by the gear 749, another ring-shaped gear 750b disposed above the ring-shaped gear 750a, and another ring-shaped gear 750c disposed above the ring-shaped gear 750b as can be clearly seen in a side view of FIG.16(B). Referring to FIG.15, the ring-shaped gears 750a, 750b and 750c are supported by three rollers 751a, 751b and 751c which support the inner periphery of the ring-shaped gears 750a, 750b and 750c such that the gears 750a, 750b and 750c are rotatable around a common rotational axis.

Referring to FIG.13 again, the base member 710a of the loading member 710 is connected to the ring-shaped gear 750a by a connecting member 755. Referring to FIG.17(A) which is an enlarged view of the gear 750a, the connecting member 755 is actually connected to a slide member 757 provided on the ring-shaped gear 750a in a slidable manner. The member 757 is further urged by a spring 756 in a direction indicated by an arrow C in FIG.17(A). Similarly, the base member 711a of the tape loading member 711 is connected to the ring-shaped gear 750c by a connecting member 758. As can be seen in FIG.17(C) which is an enlarged view of the ring-shaped gear 750c, the connecting member 758 is actually connected to a slide member 759 provided on the gear 750c in a slidable manner. It is noted that the slide member 759 is urged in the direction shown by an arrow D by a spring 760. Thus, the loading members 710 and 711 are moved responsive to the rotation of the ring-shaped gears 750a and 750c.

The rotation of the ring-shaped gear 750a is further transmitted to the ring-shaped gear 750b by a gear 752, a gear 753a meshing with the gear 752, and a gear 753b which is integral with the gear 753a. Further, the rotation of the ring-shaped gear 750a is transmitted to the ring-shaped gear 750c by the gear 752, a small gear 754a meshing with the gear 752, and a gear 754b integral with the gear 754a.

Figure 17:
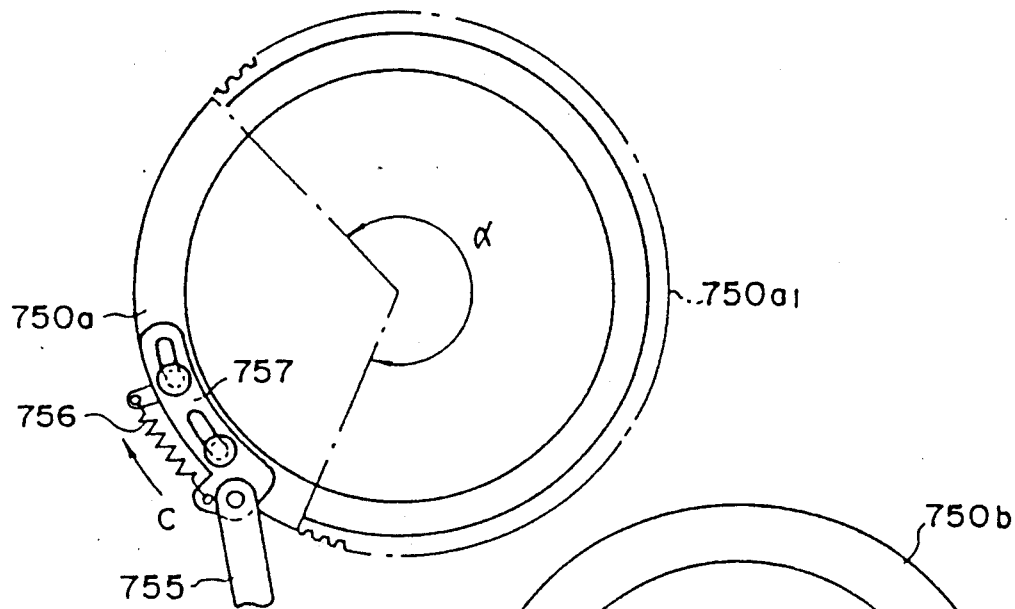
FIGS.17(A)–(C) are enlarged views showing teeth formed on a ring shaped gear used in the tape loading mechanism.
Figure 17B:
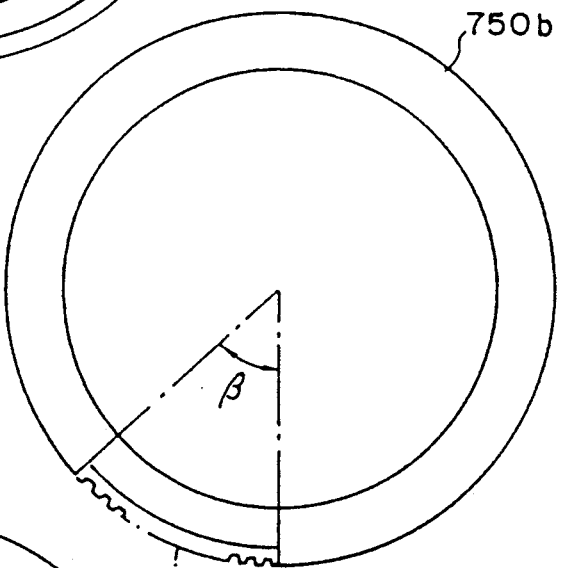
Figure 17:
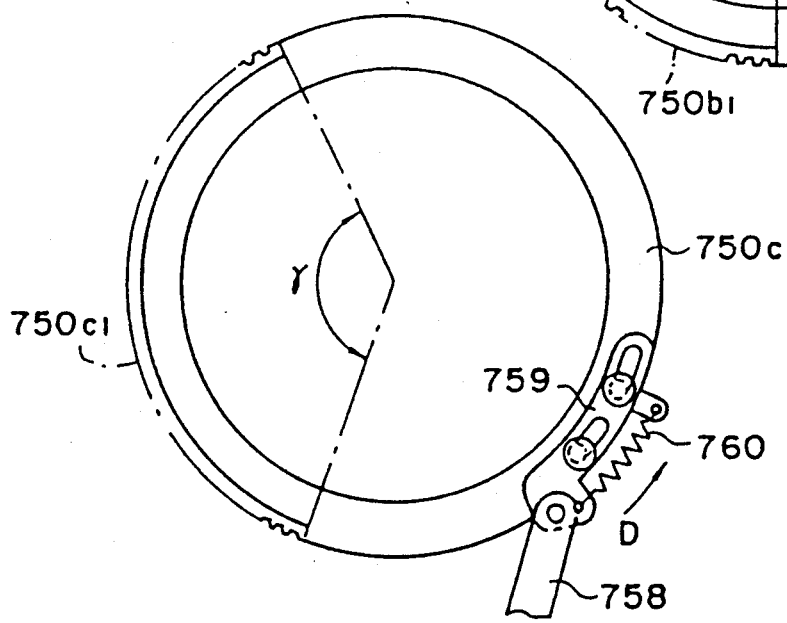

FIGS.17(A)-(C) are enlarged views of the ring-shaped gears 750a, 750b and 750c. It can be seen that the gear 750a has a toothed part $750a_I$ on its outer periphery for an angle $\alpha$. This toothed part $750a_I$ is meshed with the gear 749 which is driven by the rotation of the main cam gear 744. Similarly, the ring-shaped gear 750b has a toothed part $750b_I$ on its outer periphery for an angle $\beta$. The toothed part $750b_I$ is meshed with the gear 753b which is driven responsive to the rotation of the ring-shaped gear 750a. Further, the ring-shaped gear 750c has a toothed part $750c_I$ on its outer periphery for an angle $\gamma$. This toothed part $750c_I$ is meshed with the gear 754b which is driven responsive to the rotation of the ring-shaped gear 750a.

As shown in FIG.16(B), the ring-shaped gears 750b and 750c are stacked and connected so that they are rotated unitarily. As the ring-shaped gears 750b and 750c are stacked in a direction a shown in FIGS. 17(B) and (C), a part of the toothed part $750b_I$ and a part of the toothed part $750c_I$ are overlapped. For this reason, the pitch of the teeth in the toothed part $750b_I$ and the pitch of the teeth in the toothed part $750c_I$ are coincident to each other and the teeth of the toothed part $750b_I$ are aligned with the teeth in the toothed part $750c_I$ located above the part $750b_I$.

As the ring-shaped gear 750a is driven by the gear 749 which in turn is driven responsive to the rotation of the main cam gear 744, the loading member 710 is moved along the groove 707 with a uniform speed. On the other hand, the loading member 711 is moved with a first predetermined speed up to the HALF LOADING state when the tape loading mechanism is moved from the C STAND-BY state shown in FIG.10 or from the STD STAND-BY state shown in FIG.11 but the speed of movement of the loading member 711 is increased to a second predetermined speed faster than the first predetermined speed when the loading member 711 is past the HALF LOADING state. For this purpose, the ring-shaped gears 750b and 750c are driven by the gears 753a and 753b with a reduction ratio which equals unity until the tape loading mechanism is moved from the C STAND-BY state or from the STD STAND-BY state to the HALF LOADING state, and after the HALF LOADING state, they are driven by the gears 754a and 754b having a reduction ratio less than unity until the tape loading mechanism assumes the FULL LOADING state. As the length of the guide groove 708 is longer than the length of the guide groove 707, the movement of the loading member 711 with the increased speed relative to the speed of movement of the loading member 710 causes a simultaneous arrival of the loading members 710 and 711 at the end of the guide grooved 707 and 708.

Thus, the loading member 710 and 711 are moved from the C STAND-BY state or from the STD STAND-BY state to the HALF LOADING state, and from the HALF LOADING state to the FULL LOADING state responsive to the rotation of the ring-shaped gears 750a, 750b and 750c which in turn are driven by the rotation of the main cam gear 744. As a result of the movement of the loading members 710 and 711, the magnetic tape is drawn out from the tape cassette 2 or 3 and is wrapped around the guide drum 800 in the FULL LOADING state. Further, responsive to the reversed rotation of the ring-shaped gears 750a, 750b and 750c, the loading member 710 and 711 are moved back from the FULL LOADING state to the STD STAND-BY state or to the C STAND-BY state and the magnetic tape is returned to the tape cassette 2 or 3.

2) Pole Shifting Mechanism

The pole shifting mechanism is used to move the arms 724, 726 and 729 responsive to the driving by the motor 738. The mechanism used to drive the main cam gear 744 responsive to the rotation of the motor 738 is identical to the case of the loading member drive mechanism and the description thereof will be omitted. The main cam gear 744 shown in FIG.13 driven by the motor 738 carries a cam groove 744a and 744b shown in FIGS.1-8(A)-(D) on its lower side. Referring to FIGS.1-8(A)-(D) respectively corresponding to the C STAND-BY state, STD STAND-BY state, HALF LOADING state and the FULL LOADING state, the cam gear 744a engages a pin 761a carried at an end of a slidable lever 761 which is slidable in the $X_1$ and $X_2$ directions. Further, the cam gear 744b engages a pin 762a carried by a swing arm 762.

The slide lever 761 is connected to a fan-shaped gear 763 (FIG.13) by a pin 761b at the other end of the lever 761 as well as with a pair of leaf springs 763a which hold the pin 761b therebetween. The fan-shaped gear 763 is held rotatable on the chassis 700 by a pin 700d fixed on the chassis 700. Responsive to the counterclockwise rotation of the cam gear 744, the slidable lever 761 is moved in the $X_1$ direction due to the change in the position of the cam groove 744b engaging the pin 761a, and the fan-shaped gear 763 is rotated in the clockwise direction responsive thereto. Further, such a rotation of the fan-shaped gear 763 is transmitted to the arm 724 via a gear 764 meshing with the teeth of the fan-shaped gear 763 and a gear 724a connected to the arm 724. As a result, the arm 724 is rotated in the clockwise direction and the pole 723 at the end of the arm 724 is displaced. FIG.19(A) shows such a displacement of the pole 723 responsive to the rotation of the main cam gear 744 as a function of the rotational angle of the main cam gear 744.

Further, the rotation of the main cam gear 744 is transmitted to a gear 726a which is a part of the arm 726 via a gear 765a meshing with the gear 764, a small gear 765b which is integral with the gear 765a, and a gear 766 meshing with the small gear 765b. Thus, the arm 726 is rotated responsive to the rotational angle of the main cam gear 744 and the pole 725 carried by the arm 726 is displaced as shown in the graph in FIG.19(B).

The swing arm 762 is connected to a pin 767a the of a swing lever 767 via a leaf spring member 762b. The swing lever 767 is held rotatable on the chassis 700 by a pin 700e and carries a toothed part which in turn is engaged with a gear 768. Further, the swing arm 767 is urged in the counter-clockwise direction by a spring 769. Responsive to the rotation of the cam gear 744 in the clockwise direction, the swing arm 762 engaged with the cam groove 744a is rotated in the counter-clockwise direction. Responsive to the rotation of the swing arm 762, the gear 767 is rotated in the clockwise direction and the rotation of the gear 767 is transmitted to a gear 729a of the arm 729 carrying the pole 728. As a result, the arm 729 is rotated responsive to the rotation of the main cam gear 744 and the pole 728 is moved as shown in the graph in FIG.9(B).

3) Pinch Roller Drive Mechanism

The pinch roller drive mechanism is used to move the pinch roller 731 carried by the arm 732 such that the pinch roller 731 urges the magnetic tape to the capstan 730 in the FULL LOADING state shown in FIG.12(B). On the other hand, the pinch roller 731 is disengaged from the magnetic tape and is moved to a place so that it does not obstruct the movement of the tape loading mechanism when the tape loading mechanism is in the state other than the FULL LOADING state. For example, the arm 732 is swung upwards so that the movement of the tape loading mechanism is not obstructed in the state shown in FIG.13 or FIG.14. As shown in FIG.13, the arm 732 is held rotatably in a vertical plane upwards and downwards on a bracket 733 by a pin 733a, and the bracket 733 in turn is held rotatable in a horizontal plane on the chassis 700. The arm 732 is further urged in the upward direction by a spring (not shown) wound around the pin 733a. In other words, the arm 732 is urged such that the pinch roller 731 is displaced upwards.

FIG. 20 shows a pattern of a cam groove 744c provided on an upper surface of the main cam gear 744 for rotating the arm 732 in the horizontal plane. The main cam gear 744 further carries another cam groove 744d for pressing the pinch roller 731 to the capstan 730. In the cam groove 744c, a pin 770a of a slidable lever 770 (FIG. 13) which is sliable in the $Y_1$ and $Y_2$ directions is engaged. REferring to FIG. 13, the slide lever 770 is connected to an end of a swing lever 771 which extends generally in a perpendicular direction to the slide lever 770 and having a central part connected rotatably to the chassis 700, and the other end of the swing lever 771 is connected to another slide member 772 extending parallel to the slide lever 770 and carry teeth 772a thereon. The teeth 772a in turn mesh with a gear 733b which rotates the bracket 733 in the horizontal plane. Thus, responsive to the rotation of the main cam gear 744, the arm 732 carrying the capstan is rotated in the horizontal plane.

REferring to FIGS. 20(A) and (B), the other cam groove 744d on the main cam gear 744 engages a pin 773a of an arm 773. The arm 773 is rotatable around a pin 773b fixed on the chassis 700 and swings responsive to the rotation of the main cam gear 744 (FIG. 13). Referring to FIG. 13, the arm 773 is further connected to a generally rectangular plate member 774 which is held rotatable on a pin 700f fixed on the chassis 700. Thus, responsive to the swinging motion of the arm 773, the plate member 775 is rotated around the pin 700f. Further, on the same pin 700f, there is provided another rectangular plate member 775 such that the member 775 is rotatable around the pin 700f independently from the plate member 774. Furthermore, a spring 776 is disposed between the plate members 774 and 775 so as to urge the plate member 775 relatively to the plate member 774 in the clockwise direction. Further, the plate member 775 carries a projection 775a (FIG. 24) adapted to abut with a pin 732a formed on the arm 732 carrying the pinch roller 731. Thus, responsive to the rotation of the main cam gear 744. the swing arm 773 is rotated in the clockwise direction by the cam gear 744d as well as by the pin 773a shown in FIGS.20(A) and (B), and responsive to the swinging motion of the arm 773, the triangular plate member 774 is rotated in the counter-clockwise direction. As a result of the rotation of the plate member 774, the triangular plate member 775 is rotated in the counter-clockwise direction as a result of the force exerted by the spring 726. Thus, the pin 732a of the arm 732 is pushed by the projection 775a on the member 775 and the arm 732 carrying the pinch roller 731 is rotated in the counter-clockwise direction. At the same time, the arm 732 is lowered by a mechanism to be described responsive to the rotation of the sub-cam gear 745 which is rotated in synchronization with the main cam gear 744. As a result, the pinch roller 731 engages the capstan 730 and is pressed thereon by the force exerted by the spring 776 when the plate member 774 is fully rotated in the counter clockwise direction.

Further, the arm 732 is moved upwards and downwards by the rotation of the sub-cam gear 745 carrying a cam groove 745a as shown in FIG.21. It should be noted that FIG.21 is a rear view of the tape loading mechanism used in the tape cassette loading system of the present invention. Referring to FIG. 21, a pin 777a carried at an end of a lever 777 engages cam groove 745a and the lever 777 is held rotatably in a vertical plane by a bracket 778 fixed on the chassis 700. Thus, the lever 777 is raised or lowered responsive to the rotation of the sub-cam gear 745. Further the lever 777 carries a roller 777b at the other end and the roller 777b engages a plate member 732b formed at an end of the arm 732 remote from the end on which the pinch roller 731 is carried. As already described, the arm 732 is urged by a spring provided around the pin 733a so that the arm 732 is raised. As a result, the contact between the roller 777b and the plate member 732b is maintained. Thus, the arm 732 is raised or lowered responsive to the rotation of the sub-cam gear 745 and the main cam gear 744.

4) Mechanism for Moving Tension Arm and Erase Head

As can be seen in FIG.13, the arm 713 is urged by a spring 714 in the counter-clockwise direction so that the arm 713 contacts the loading member 710. Thus, the arm 713 is rotated to a position in which the pole 713a at the end of the arm is located in the cutout portion 2g of the size tape cassette when the tape loading mechanism is in the STD STAND-BY state or to another position in which the pole 713a is located in the cutout portion 3f of the compact size tape cassette 3 when the tape loading mechanism is in the C STAND-BY state. In other words, the arm 713 is moved in the counter-clockwise direction by the spring 714 responsive to the movement of the base member 710a of the loading member 710 along the guide groove 707 toward the direction indicated by the arrow A. With a further movement of the loading member 710 in the direction A, the base member 710a is finally disengaged from the arm 713. This situation is shown in FIG.22. Referring to FIG.22, it can be seen that the base member 710a carries a leaf spring member or resilient plate 712 on its side facing the guide drum 800 such that the plate 712 extends in the direction A. Thus, as the loading member 710 is moved in the direction A, the plate 712 engages a contact part 720b provided on a base member 720 carrying an erase head 719 for engagement with the resilient plate 712 and urges the base member 720 to the left. The base member 720 is held rotatably on the chassis 700 by a pin 720a. Thus, as a result of the engagement with the plate 712, the base member 720 is rotated in the counter-clockwise direction. Responsive to the rotation of the base member 720, an arm 720c of the base member 720 engages the arm 713 and the arm 713 is momentarily moved to the right. With a further movement of the base member 710a the loading member 710 to the FULL LOADING state shown in FIG.12(B), the base member 710a of the loading member 710 passes over the base member 720 and the base member 720 is disengaged from the base member 710a of the loading member 710. As a result, the base member 720 is rotated in the clockwise direction and returns to its original state shown in FIG.13. Responsive to this movement of the base member 720, the arm 713 is further moved in the counter-clockwise direction from the state shown in FIG.22 and the pole 713a at the end of the arm 713 is accommodated in a depressed part 720d of the base member 720. As a result, the arm 713 is moved to a location suited for giving tension to the magnetic tape at the time of recording and reproduction. At the same time, the toggle member 715 connected to the arm 713 shown in FIG.13 is fully stretched and the brake band 716 engages the reel disk 504 which drives the supply reel of the tape cassette 2 or 3 and an appropriate tension is applied to the magnetic tape.

When the tape loading mechanism is moved from the FULL LOADING state to the STD STAND-BY state or to the C STAND-BY state, the base member 710a of the loading member traces a path exactly opposite to the path already described. Thus, the leaf spring member 712 of the base member 710a presses the contact part 720b of the base member 720 such that the base member 720 is displaced to the left. As a result, the base member 720 is rotated in the counter-clockwise direction and the arm 720c of the base member 720 urges the arm 713 such that the arm 713 is rotated in the clockwise direction. As a result, the pin 713a at the end of the arm 713 is disengaged from the depressed part 720d of the base member 720.

Figure 18A:
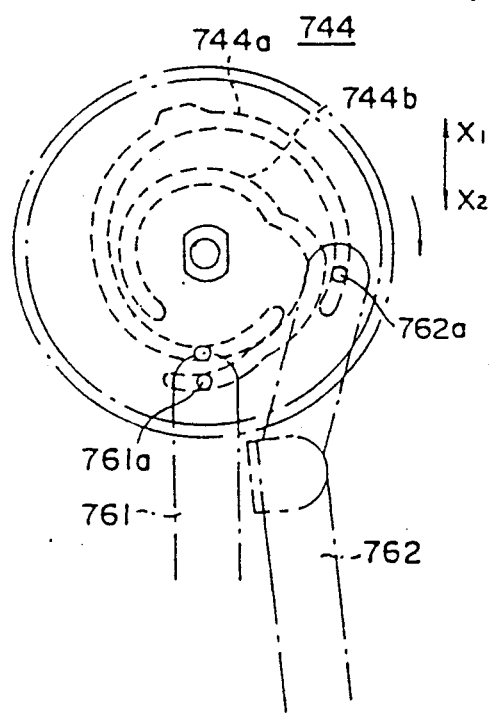
FIGS.18(A)–(D) are diagrams showing a pattern of cam grooves formed on a lower surface of a main cam wheel used in the tape loading mechanism.
Figure 18B:
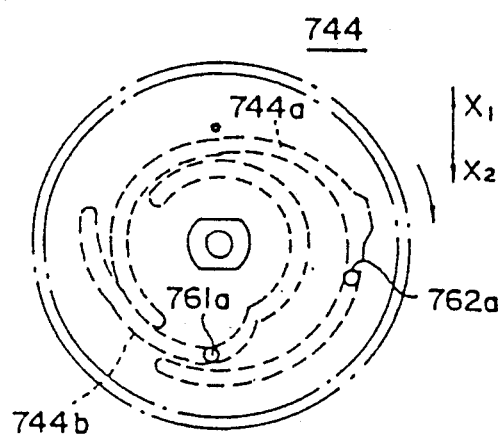

Next, the operation of the tape cassette loading mechanism as described heretofore will be described in detail first for the case in which the standard size tape cassette 2 is loaded. When the standard size tape cassette 2 is placed on the cassette tray 300, the tape cassette 2 is detected by the switches 307 on the cassette tray 300. When the tape loading mechanism is in the C STAND-BY state shown in FIG.10 at the beginning of the operation, the motor 738 is driven by a controller, to be described later with reference to FIG.27, responsive to the start of the operation of the tape cassette loading system and the worm gear 743 is rotated responsive to the rotation of the motor 738. As a result, the main cam gear 744 meshing with the worm gear 743 is rotated in the clockwise direction as shown in FIG.18(B) for 90 degrees. Referring to FIGS.15 and 16, this rotation of the main cam gear 744 is transmitted to the ring-shaped gear system 750 as already described. As a result, the ring-shaped gear 750a is driven in the clockwise direction and the ring-shaped gears 750b and 750c are driven in the counter clockwise direction and the loading members 710 and 711 FIG.11. Furthermore, the tension arm 713 is moved to the state shown in FIG.11 responsive to the movement of loading member 710.

Thus, when the standard size tape cassette 2 is lowered together with the cassette tray 300 to the STD state as shown in FIG. 5(D), the guide rollers 710b and 711b on the loading members 710 and 711, and the poles 710c, 711c, 713a, 723 and 725 are received in the depressed parts 2g and 2h on the standard size tape cassette shown in FIG. 1(A). Further, the reel disks 704 and 705 engage the openings 2d and 2e of the standard size tape cassette 2, and the light emitting element is received in the opening 2f at the bottom of the tape cassette 2.

Responsive to the further rotation of the motor 738, the main cam gear 744 is rotated further in the clockwise direction. Referring to FIG. 16(B), responsive to the rotation of the motor 738, the ring-shaped gears 750a, 750b and 750c are further rotated in the respective directions and the tape loading members 710 and 711 are moved in the directions A and B to the HALF LOADING state as shown in FIG. 12(A). At the same time, the arm 713 is rotated in the counter-clockwise direction responsive to the movement of the loading member 710 and reaches the position shown in FIG. 12(A). Further, the arms 724 and 726 carrying the poles 723 and 725 are displaced to the position shown in FIG. 12(A) together with the arms 724 and 726 rotating in the clockwise direction responsive to the movement of the slide lever 761 in the $X_1$ direction as a result of the engagement of the pin 761a with the cam groove 744b on the main cam gear 744. Thus, the magnetic tape is drawn out from the tape cassette 2 and forms a tape path starting from the tape cassette 2 and returning to the tape cassette 2 after passing through the guide roller 710b and the poles 728, 725 and 723. In this state, the magnetic tape is not wrapped around the guide drum 800 as the arm 729 carrying the pole 728 is not moved from the position in FIG. 11. Further, the pinch roller 731 is still in the raised position and therefore does not engage the tape path.

Figure 18C:
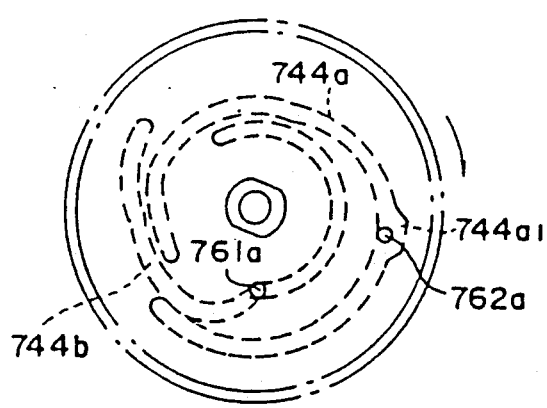
Figure 18D:
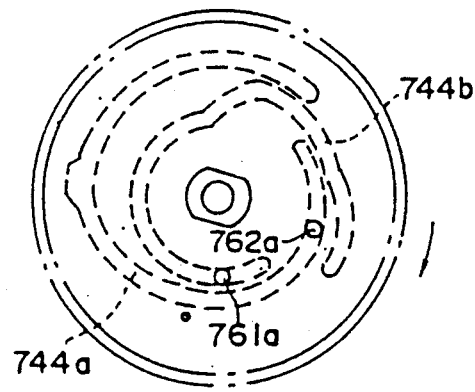

Referring now to FIG. 18(C) corresponding to the HALF LOADING state, it is noted that the pin 762a of the lever for engagement with the cam groove 744a engages a portion 744a₁ of the cam groove 744 having a broadened width. Thus, the arm 762 can rotate in the clockwise direction for a limited range. As a result, the arm 729 is rotated for a limited angular range in the counter-clockwise direction because of the urging force exerted by the spring 769 so as to urge the gear 767 in the counter-clockwise direction. As a result of this movement of the arm 729, the magnetic tape indicated by a reference numeral 780 is applied with a weak tension.

In the HALF LOADING state shown in FIG. 12(A), the user commands the recording and reproducing operation of magnetic recording and reproducing apparatus via the controller. Responsive to the command, the motor 738 is further rotated and the main cam gear 744 is rotated in the clockwise direction to the state shown in FIG. 18(D). Thus, FIG. 18(D) corresponds to the FULL LOADING state.

Figure 23:
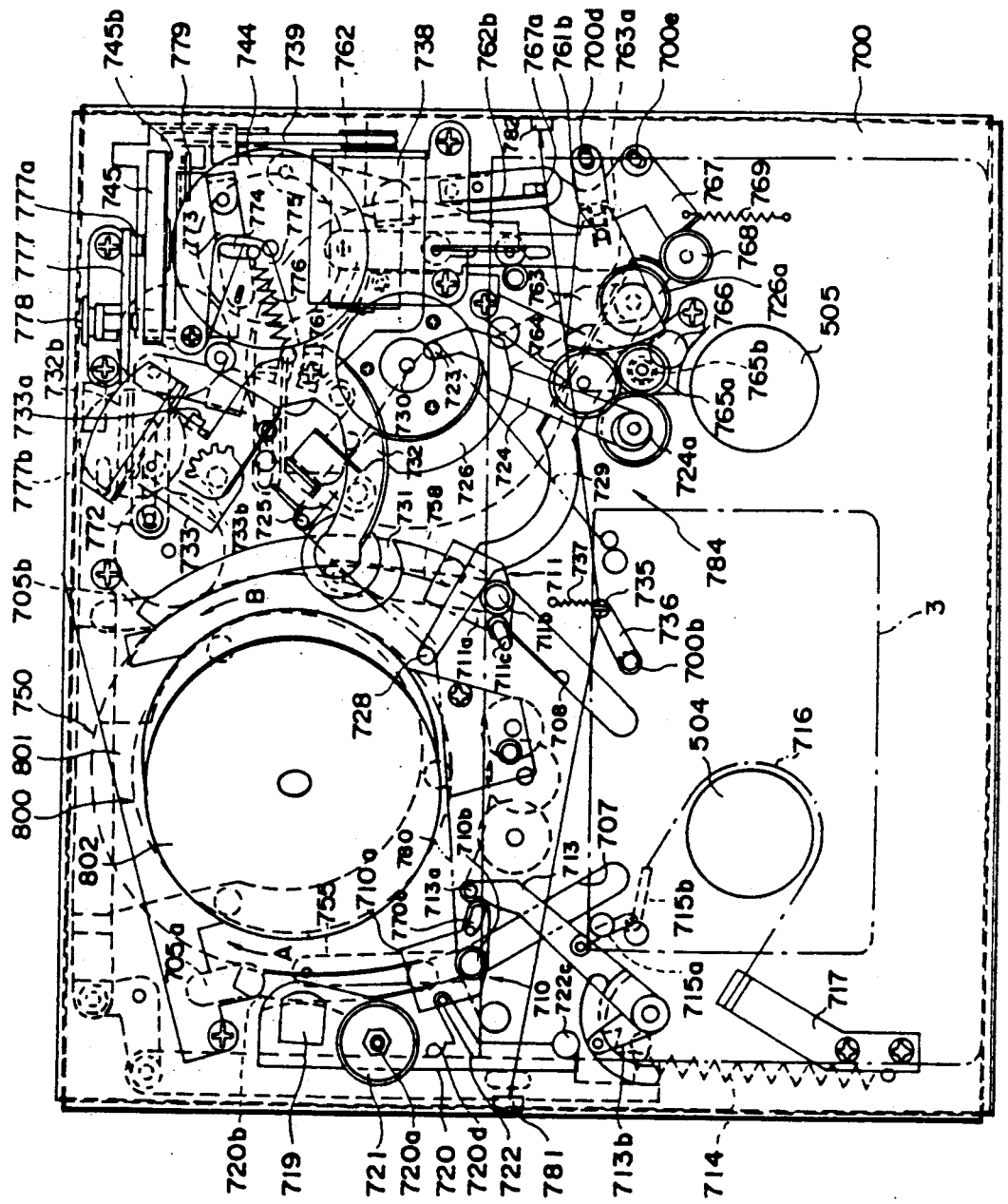
FIG.23 is a plan view showing the details of the tape loading mechanism in the half loading state.

Referring to FIG. 23, responsive to the rotation of the main cam gear 744, the pin 762a on the lever 762 is displaced to the inside of the main cam gear 744 and the lever 762 is rotated in the counter-clockwise direction. As a result, the arm 729 carrying the pole 728 is swung for a large angle in the clockwise direction and assumes a position such that the pole 728 does not obstruct the movement of the loading member 711. As a result of the rotation of the main cam gear 744, the main gear 744' which is integral with the main cam gear 744 is rotated in the same direction as the main cam gear 744, and the ring-shaped gears 750b and 750c are rotated together in the counter-clockwise direction. Thereby, the meshing of the teeth 750b₁ of the ring-shaped gear 750b and the gear 753b is disengaged and the teeth 750c₁ of the ring-shaped gear 750c is meshed with the gear 754b. Thus, the loading member 710 is moved along the guide groove 707 in the direction indicated by the arrow A while the loading member 711 is moved along the guide groove 708 in the direction indicated by the arrow B with an accelerated speed. As a result, the loading members 710 and 711 abut to stoppers 705a and 705b at the end of the grooves 707 and 708 while wrapping the magnetic tape on the guide drum 800. Once the loading members 710 and 711 are abut to the stoppers 705a and 705b, the base members 710a and 711a of the loading members 710 and 711 are urged toward the stoppers 705a and 705b by the springs 756 and 760 provided on the ring-shaped gears 750a and 750c.

Responsive to the completion of the movement of the loading member 710 to the position shown in FIG. 24, the arm 713 is rotated in the counter-clockwise direction with the movement of the lading member 710 as already described. As a result, the pole 713a is moved to a position located between an impedance roller 721 and a guide pole 722 carried by the base member 720. As a result of the movement of the arm 713, the toggle member 715 is fully stretched such that the legs 715a and 715b are aligned on a straight line. In this state, the brake band 716 is pulled by the toggle member 715 and contacts the periphery of the reel disk 504. Thus, the magnetic tape is applied with tension.

With the rotation of the main cam gear 744, the sub-cam gear 745 meshing with the worm gear 743 is also rotated. Thus, after the loading member 711 has moved along the guide groove 708 in the direction indicated by the arrow B and passed below the pinch roller 731, the arm 777 is rotated in the counter-clockwise direction as a result of the engagement of the pin 777a with the cam groove 745a. As a result, the plate member 732b of the arm 732 is moved upwards by the action of the roller 777b pushing the member 732b in the upward direction. As a result, the arm 732 is rotated around the pin 733a and the pinch roller 731 carried at the end of the arm 732 is lowered. At the same time, the cam grooves 744c and 744d at the upper side of the main cam gear 744 are rotated in the clockwise direction as shown in FIG. 20(B). Thus, the pin 770a at the end of the lever 770 is moved toward the center of the main cam gear 744 along the cam groove 744c and the slide lever 770 is displaced in the direction indicated by the arrow $Y_2$. Further, the pin 773a of the arm 773 engaging the cam groove 744d is moved toward the periphery of the main cam gear 744 responsive to the rotation of the main cam gear 744. Thus, the arm 773 is swung in the clockwise direction.

As shown in FIGS. 20 and 21, when the pinch roller 731 is lowered, the slide lever 770 is displaced in the direction indicated by the arrow $Y_2$ and this displacement is transmitted to the slide member 772. In other words, the slide member 772 in moved in the $Y_1$ direction. Responsive to the movement of the slide member 772, the bracket 733 is rotated in the counter-clockwise direction and the pinch roller 731 is pressed toward the capstan 730. Thereafter, with a further rotation of the arm 773 in the clockwise direction, the plate members 774 and 775 are rotated in the counter-clockwise direction. As a result, the projection 775a of the plate member 775 abuts the pin 732a of the arm 732 and the arm 732 is urged in the counter-clockwise direction by the force exerted by the spring 776. Thus, the pinch roller 731 is urged toward the capstan by the spring 776 and the magnetic tape is held firmly between the capstan 730 and the pinch roller 731. It should be noted that the capstan 730 is driven by a capstan motor 730a located below the chassis 700.

As the operation at the time of unloading is a reversal of the operation at the time of loading, the description thereof will be omitted.

Next, the loading of the compact size tape cassette 3 will be described. Similarly to the case of the standard size tape cassette, the placement of the compact size tape cassette is detected by the pair of switches 308 disposed on the depression 302 provided on the cassette tray 300. When the tape loading mechanism is in the STD STAND-BY state as shown in FIG.11, the motor 738 is driven by the controller such that the worm gear is rotated in the reversed direction and the main cam gear 744 assumes the rotational angle as shown in FIG.18(A). In other words, FIG.18(A) shows the main cam gear 744 in the C STAND-BY state. Responsive to the rotation of the worm gear 743 in the reversed direction, the ring-shaped gear 750c of the ring-shaped gear system 750 is rotated in the clockwise direction and the ring-shaped gears 750a and 750b are rotated in the counter-clockwise direction. As a result, the loading members 710 and 711 are moved to the state as shown in FIG. 10, which is the C STAND-BY state. When the tape lading mechanism is already in the C STAND-BY state, this preliminary movement of the tape loading mechanism is not necessary. Together with the movement of the loading member 710, the arm 713 is rotated in the clockwise direction and assumes the position shown in FIG.10. Further, responsive to the rotation of the main cam gear 744, the slide lever 761 having the pin 761a engaged with the cam groove 744b is displaced in the $X_2$ direction shown in FIG.18(A). As a result of the movement of the lever 761, the arms 724 and 726 carrying the poles 723 and 725 are rotated in the counter-clockwise direction as shown in FIG.16(A). Thus, the guide pole 723 and the half loading pole 725 are moved to the position shown in FIG.10 corresponding to the C STAND-BY state.

Thus, when the compact size tape cassette 3 is lowered together with the cassette tray 300, the guide rollers 710b and 711b of the loading members 710 and 711, and the poles 710c and 711c as well as the poles 723 and 725 are received in the depressed parts 3f, 3g and 3h formed on the compact size tape cassette 3.

Further, the arm 736 carrying the light emitting element 735 is rotated in the clockwise direction against the force exerted by the spring 737 by the arm 724 moving in the counter-clockwise direction. Thus, the light emitting element 735 is also received in the depressed part 3h of the compact size tape cassette 3 together with the pole 723. Thus, the light emitting element 735 does not obstruct the movement of the tape cassette 3 from the CLOSED state to the C state.

When the compact size tape cassette 3 is lowered to the C state, the reel disk 504 at the supply side engages the opening 3c at the bottom of the tape cassette 3. Further, the drive gear 603 is raised as already described and the take up reel of the compact size tape cassette 3 is driven by the drive gear 603.

When the compact size tape cassette 3 has reached the C state, the motor 738 is rotated similarly to the case of the standard size tape cassette 2, and the tape loading mechanism is set to the HALF LOADING state as shown in FIG.12(A). In this state, the light emitting element 735 is returned to the position shown in FIG.13 as a result of the clockwise rotation of the arms 724 and 726 urging the arm 736 carrying the light emitting element 735.

Further, the tape loading mechanism is moved to the HALF LOADING state and to the FULL LOADING state similarly to the case of the standard size tape cassette When transporting the magnetic tape with a high speed in the forward direction or reversed direction, the tape loading mechanism is set to the HALF LOADING state.

Figure 25:
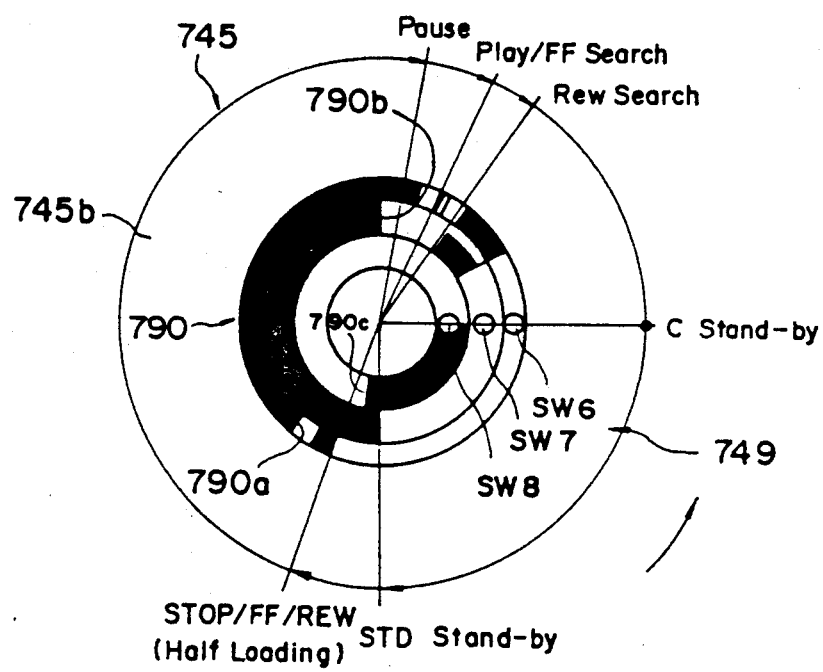
FIG.25 is a diagram showing a reflection pattern provided on the main cam wheel for detecting the state of the tape loading mechanism.

Next, a detecting system 749 used for detecting the rotational angle of the sub-cam gear 745 will be described. From the description heretofore, it will be understood that the state of the tape loading mechanism such as the loading members 710 and 711, and the arms 713, 724, 726, 729 and 732 is determined uniquely by the rotation of the cam gear 744. In other words, the state of the tape loading mechanism is indicated by the rotational angle of the cam gear 744. As already described, the cam gear 744 is driven by the worm gear 743 which also drives the sub-cam gear 745 with a one-to-one correspondence with the main cam gear 744. Thus, the rotational angle of the sub-cam gear 745 represents the state of the loading mechanism In the present embodiment, the sub-cam gear 745 carries on its surface 745b facing in the front direction a plurality of concentric reflection patterns 790a, 790b and 790c as illustrated in FIG.25. In order to detect the reflection patterns, the detecting system 749 comprising a plurality of photo sensors SW6, SW7 and SW8 aligned horizontally as shown in FIG.25 is provided so as to face the patterns 790a, 790b and 790c, respectively.

Figure 26:
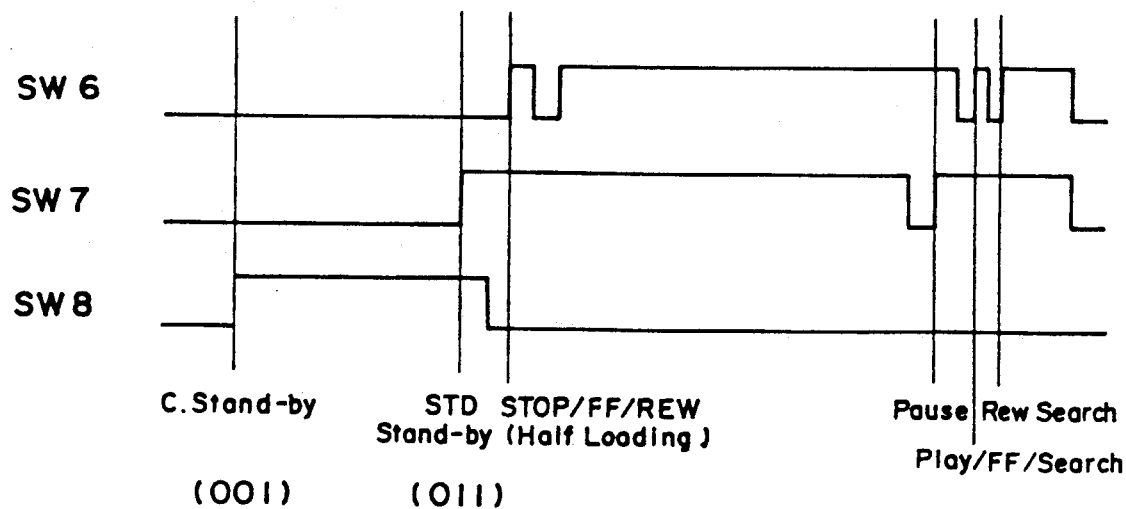
FIG.26 is a diagram showing the output of sensors used for detecting the reflection pattern of FIG.25.

Responsive to the rotation of the sub-cam gear 745, the reflection of light detected by the sensors SW6-SW8 is changed as illustrated in FIG.26. Thus, in the C STAND-BY state shown in FIG.10 where the tape loading mechanism is in the state ready for loading of the magnetic tape in the compact size tape cassette, the sensors SW6, SW7 and SW8 detect the reflection from the portion of the reflection pattern indicated by C STAND-BY in FIG.25. In this state, the sensors SW6 and SW7 detecting reflection from the patterns 790a and 790b produce a low level output while the sensor SW8 produces a high level output. Thus, in the state shown in FIG.10, the state of the detecting system 749 may be represented by (001). Responsive to a further rotation of the sub-cam gear 745 in the counterclockwise direction from the C STAND-BY state in FIG.10, the tape loading mechanism assumes a second state in which the portion of the reflection patterns indicated by STD STAND-BY coincides with the horizontally aligned sensors SW6, SW7 and SW8. In this state, the sensor SW6 which faces the reflection pattern 790a produces a low level output while the sensors SW7 and SW8 which face the reflection patterns 790b and 790c produce a high level output as shown in FIG.15. Thus, in the STD STAND-BY state, the state of the detecting system 749 may be represented by (011).

In the state shown in FIG.11 corresponding to the STD STAND-BY state of the tape loading mechanism, the tape loading mechanism such as the loading members 710 and 711, and the arms 713, 724, 726, and 729 are moved to a state ready for drawing out the magnetic tape from the standard size tape cassette and for wrapping the magnetic tape around the guide drum 800. It should be noted that the poles 713a, 723, 725 and 728 at the end of the arms are positioned so as to be accepted in the cutout portions 2g and 2h of the standard size tape cassette 2 on the cassette tray 300 through the cutout 303 of the cassette tray. In this state, the sub-cam gear 745 is in a state further rotated in the counterclockwise direction, and the portion of the reflection patterns 790a, 790b and 790c indicated as STD STAND-BY is aligned with the horizontal row of the sensors SW6–SW8. Thus, the output of the sensor SW6 which does not face the reflection pattern 790a assumes a low level state while the output of the sensors SW7 and SW8 which face the reflection patterns 790a and 790b assumes a high level state. In other words, the state of the detecting system 749 in the STD STAND-BY state shown in FIG.11 may be represented by (011).

In the HALF LOADING state shown in FIG.17(A) used for the STOP mode, the FAST FORWARD mode, and the REWIND mode, the motor 710 is further rotated and the tape loading mechanism is moved further in the direction of the drum 800. It can be seen that the guide roller 710b and the pole 725 are used to draw out the magnetic tape from the compact size tape cassette 3 and the guide roller 710b and the pole 725 are used to draw out the magnetic tape from the standard size tape cassette 2. In the drawing, the path of the magnetic tape is represented by a broken line. Further, the pole 728 prevents the magnetic tape from being wrapped around the drum 800. Responsive to this state, the sub-cam gear 745 is further rotated in the counterclockwise direction, and the sensors SW6–SW8 produce output signals as indicated by STOP/FF/REW in FIG.26.

In the FULL LOADING state shown in FIG.17(B) in which the magnetic tape is wrapped around the drum 800 by the oblique poles 710c and 711c held on the loading members 710 and 711 and such that the path of the magnetic tape is defined further by the pole 713a, guide rollers 710b and 711b, and the pole 723 and further such that the magnetic tape is held between the capstan 730 and the pinch roller 731, the cam gear 745 is further rotated in the counterclockwise direction and the sensors SW6–SW8 produce the output signals responsive to the portion of the reflection patterns 790a, 790b and 790c indicated by Play/FFSearch as shown in FIG.26.

Figure 27:
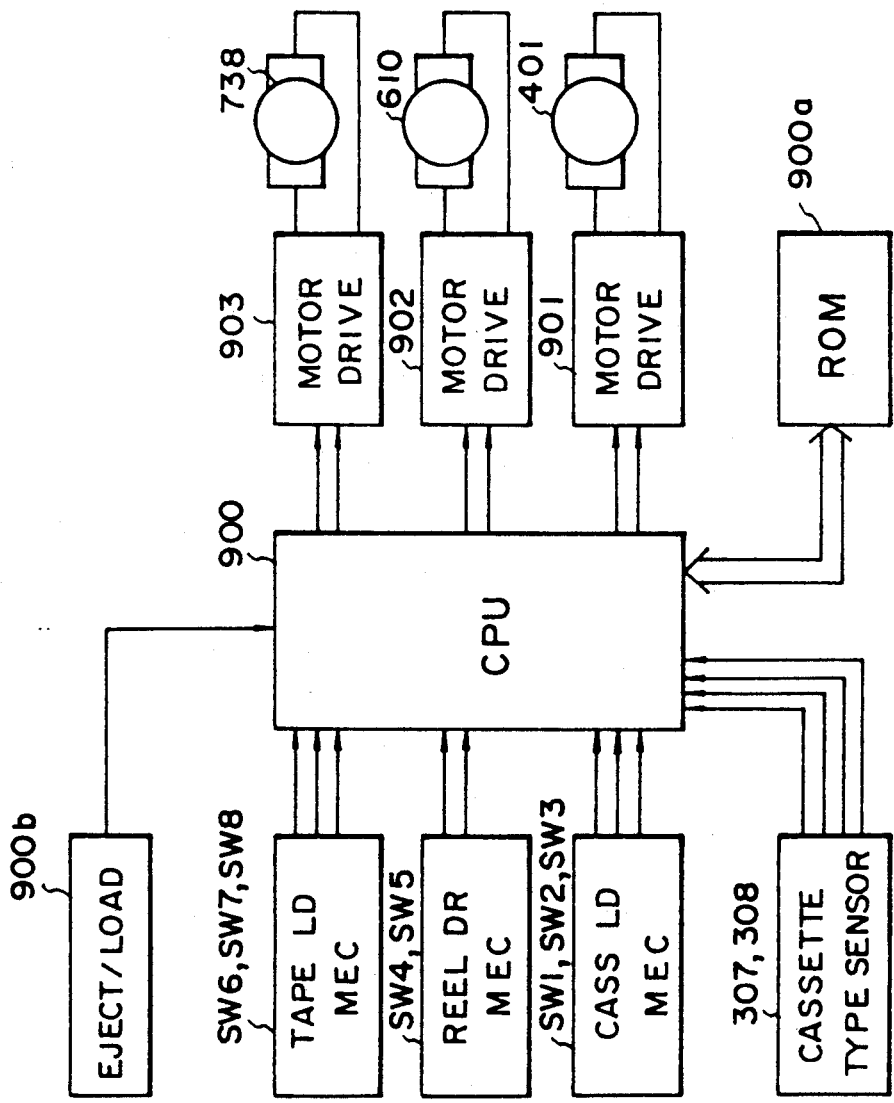
FIG.27 is a block diagram showing a controller used for controlling the tape cassette loading system of the present invention.

It should be noted that the tape loading mechanism should assume the C STAND-BY state shown in FIG.10 when the compact size tape cassette is placed on the cassette tray 300 and is moved to the C state shown in FIG.3(C). Further, in the C STAND-BY state, the reel drive mechanism should be in the UP state shown in FIG.7(B). On the other hand, the tape loading mechanism should assume the STD STAND-BY state shown in FIG.11 when the standard size tape cassette is placed on the cassette tray 300 and is moved to the STD state shown in FIG.3(D). Further, in this STD STAND-BY state, the reel drive mechanism should be in the DOWN state shown in FIG.7(C). Furthermore, the tape loading mechanism has to be moved to the HALF LOADING state and to the FULL LOADING state responsive to the command by the user. Furthermore, when the type of the tape cassette placed on the cassette tray 300 is changed, the states of the tape cassette loading mechanism, the reel drive mechanism, and the tape loading mechanism should be changed. For this purpose, the cassette loading mechanism, reel drive mechanism and the tape loading mechanism of the tape cassette loading system of the present invention use a controller comprising a microprocessor. FIG.27 shows a block diagram of a control system used for controlling the cassette loading mechanism, the reel drive mechanism, and the tape loading mechanism. Referring to the drawing, the control system comprises a controller 900 which detects the state of the switches 307 and 308 for discriminating the type of tape cassette placed on the cassette tray, the state of the optical sensors SW1–SW3 for detecting the state of the cassette loading mechanism, the state of the switches SW4 and SW5 for detecting the state of the reel drive mechanism, and the state of the switches SW6 SW8 for detecting the state of the tape loading mechanism and controls the motors 401, 610 and 710 through respective drive circuits 901-903. The controller 900 is a microcomputer and controls the motors 401, 610 and 738 according to a program stored in a memory 900a responsive to a key generally shown in FIG. 27 by the reference numeral 900b. Further, the program for system is stored in a memory 900a connected to the microcomputer 900 by a bus.

Further, various variations and modifications may be made without departing from the scope of the invention.

What is claimed is:

1. A tape loading mechanism of a magnetic recording/reproducing apparatus for recording and/or reproducing an information signal on and from a magnetic tape contained in one of first and second tape cassettes which is held at a respective one of first and second predetermined positions in a body of the magnetic recording/reproducing apparatus, for loading and unloading the magnetic tape on a rotary drum means of the magnetic recording and reproducing apparatus on which magnetic heads for recording and reproduction of the infraction are carried, comprising:

a chassis fixed on the body of the magnetic recording/reproducing apparatus such that said first tape cassette having a first size and held at said first predetermined position in the body of the magnetic recording/reproducing apparatus is positioned above a first predetermined area defined on the chassis and that said second tape cassette having a second size substantially smaller than said first size and held at said second predetermined position in the body of the magnetic recording/reproducing apparatus is positioned above a second predetermined area of the chassis included in said first predetermined area, said chassis further carrying said rotary drum means at a position outside said first predetermined area;

first and second arcuate guide grooves respectively provided on said chassis with the rotary drum means being located therebetween, each of said arcuate guide grooves comprising a first part located outside said first predetermined area first predetermined area and said, a second part located inside said first predetermined area but outside said second predetermined area, and a third part located inside said first predetermined area and said second predetermined area;

first and second loading members respectively held on said chassis in a manner movable along said first and second arcuate guide grooves, each of said loading members carrying an oblique pole adapted to carry the magnetic tape and to wrap it around the rotary drum means when the loading members are located at respective first positions in said first parts of said first and second guide grooves, respectively said oblique poles on the loading members being accepted in a depressed part at a front side of the first tape cassette which faces the rotary drum means when the first tape cassette is held at the first predetermined position in the body of a magnetic recording/reproducing apparatus and said first and second loading members are respectively located at second positions in said second parts of said first and second guide grooves, and said oblique poles on the loading members being accepted in a depressed part at a front side of the second tape cassette which faces the rotary drum means when the second tape cassette is held at the second predetermined position in the body of the magnetic recording/reproducing apparatus and said first and second loading members are respectively located at third positions in siad third parts of said first and second guide grooves; and a motor driving means comprising a motor for moving said first and second loading members along said first and second guide grooves respectively between said first, second and third positions.

2. A tape loading mechanism as claimed in claim 1 wherein said motor driving means comprises a first ring-shaped gear supported rotatably on the chassis at a position below the rotary drum means so as to be driven by the motor and a second ring-shaped gear supported rotatably on the chassis so as to be driven by the first ring-shaped gear about a rotational axis which is common to the rotational axis of the first ring-shaped gear in a direction opposite to the direction of rotation of the first ring-shaped gear, and said first and second loading members being respectively connected to said first and second ring-shaped gears by link arms such that the loading members are displaced responsive to the rotation of the ring-shaped gears.

3. A tape loading mechanism as claimed in claim 1 wherein said driving means comprises means for moving said first and second loading members between said second and third positions at the same speed and means for moving said first and second loading members between said first and second positions at different speeds.

4. A tape loading mechanism as claimed in claim 1 in which said tape loading mechanism further comprises first and second swing arms respectively carrying first and second poles thereon, said swing arms being supported rotatably on the chassis about respective rotary axes located relatively close to the take up reel of the tape cassette as compared to the distance from the rotary drum means when said one of said first and second tape cassettes is held at said respective one of said first and second predetermined positions in the body of the magnetic recording/reproducing apparatus, said first swing arm being rotatable for a first predetermined angle subtending between a first angular state and a second angular state such that the first pole carried by the first swing arm is located substantially outside said first predetermined area when the first arm is in its first angular state and that the first pole carried by the first swing arm is located substantially inside said second predetermined area on the chassis when the first swing arm is in its second angular state, and said second swing arm being rotatable for a second predetermined angle substantially smaller than said first predetermined angle and subtending between a first angular state which is intermediate to the first and second angular states of said first swing arm and a second angular state substantially identical with the second angular state of the first swing arm such that the second pole carried by the second swing arm is located substantially outside the first predetermined are when the second swing arm is in its second angular state and that the second pole carried by the second swing arm is located substantially inside the second predetermined area when the second swing arm is in its second angular state.

5. A tape loading mechanism as claimed in claim 4 in which said tape loading mechanism further comprises a second drive mechanism for respectively moving said first and second swing arms between their first and second angular states, said second drive mechanism comprising a main cam gear means driven by the motor, a gear system driven by the main cam gear means, and gears formed on the first and second swing arms which are driven responsive to the rotation of the gear system, said second drive mechanism moving said first and second swing arms to their respective first angular states responsive to the rotation of the motor in a first rotational direction wherein the first and second poles on the swing arms are displaced from said first and second predetermined areas on the chassis and the magnetic tape is drawn out from the tape cassette, said second drive mechanism further moving said fist and second swing arms to their respective second angular states responsive to the rotation of the motor in a second rotational direction wherein the first and second poles are accepted in the depressed part of the second tape cassette, and said second drive mechanism further moving said first and second swing arms to respective third angular states responsive to the rotation of the motor in either of said first or second rotational directions wherein said first and second poles are accepted in the depressed part of the first tape cassette when the first tape cassette is held at the first predetermined position in the body of the magnetic recording/reproducing apparatus.

6. A tape loading mechanism as claimed in claim 5 further comprising a light emitting element at an end of a third swing arm held rotatably on said chassis such that the light emitting element is movable between a first position in which the light emitting element is adapted in a hole provided at a bottom of the first tape cassette when the first tape cassette is held at said first predetermined position in the body of the magnetic recording/reproducing apparatus and a second position in which the light emitting element is accepted in the depressed portion provided on the second tape cassette when the second tape cassette is held at said second predetermined position in the body of the magnetic recording/reproducing apparatus.

7. A tape loading mechanism as claimed in claim 6 in which said third swing arm carrying the light emitting element is urged by a spring in a first direction so that the light emitting element is located at its first position, and said third swing arm is adapted to be urged by the first swing arm in a second direction opposite to the first direction against the force exerted by the spring when the first swing arm is rotated toward its second angular state, and said light emitting element is located at its second position when the first swing arm is in its second angular state.

8. A tape loading mechanism as claimed in claim 6 in which a fourth swing arm carrying a fourth pole on its free end is provided rotatably on the chassis at a side relatively close to the supply reel with reference to the rotary drum means when said one of said first and second tape cassettes is held at said respective on of said first and second predetermined positions in the body of the magnetic recording/reproducing apparatus, said fourth swing arm being rotatable between a first angular state in which the fourth pole at the end of the arm is located close to the front end of the first guide groove and a second angular state in which the fourth pole is located substantially outside the first predetermined area defined on the chassis, said fourth swing arm being urged elastically toward its second angular state, and said fourth swing arm being moved between its first and second angular states responsive to the movement of the first loading member.

9. A tape loading mechanism as claimed in claim 8 in which the tape loading mechanism further comprises a deformable member having a first end connected to the fourth swing arm and a second end connected to an end of a resilient brake member which in turn is connected to the chassis at its second end for applying resistance to the movement of the supply reel of said one of said first and second tape cassettes which is held at said respective one of said first and second predetermined positions in the body of the magnetic recording/reproducing apparatus, said deformable member being folded responsive to the movement of the fourth swing arm toward its first angular state due to the resiliency of the brake member such that the resilient brake member does not change its shape substantially unless the deformable member is fully stretched responsive to the movement of the fourth swing arm toward its second angular state.

10. A tape loading mechanism as claimed in claim 9 in which said deformable member is a toggle member comprising first and second legs connected to each other rotatably about a hinge so as to be folded and stretched freely for a limited angular range subtended between the first and second legs, said first leg of the toggle member being connected to the fourth swing arm and the second leg of the toggle member being connected to the resilient brake member.

11. A tape loading mechanism as claimed in claim 8 in which said tape loading mechanism further comprises a fifth swing arm carrying a fifth pole at its end, said fifth swing arm being held rotatably on the chassis at the side relatively close to the take up reel of said one of said first and second tape cassettes when said one tape cassette is held at said respective one of said first and second predetermined positions in the body of the magnetic recording/reproducing apparatus, said fifth swing arm being movable between a first angular state in which said fifth pole is located substantially outside said first predetermined area and is located close to a front end of the rotary drum means facing said one tape cassette and a second angular state in which said fifth pole is rotated away from the first predetermined area.

12. A tape loading mechanism as claimed in claim 11 in which said tape loading mechanism further comprises a third drive mechanism for moving the fifth swing arm between its first and second angular states, said third drive mechanism comprising a cam means driven by the motor, link means held rotatable on the chassis and driven by the cam means, a gear system held rotatable on the chassis and driven by the link means, and teeth at an end of the fifth swing arm and meshed with said gear system, said fifth swing arm being rotated toward its second angular state responsive to the rotation of the motor in the first rotational direction and toward its first angular state responsive to the rotation of the motor in the second rotational direction.

13. A tape loading mechanism as claimed in claim 12 in which said first angular state of the fifth swing arm is chosen such that the fifth pole at the end of the fifth swing arm carries the magnetic tape such that the magnetic tape makes a tangential contact with the front end of the rotary drum means when the fifth swing arm is in its first angular state.

14. A tape loading mechanism as claimed in claim 12 in which said cam means comprises a cam wheel carrying a cam groove thereon, said cam groove having a pattern designed such that the fifth swing arm is not moved as long as the first and second loading members are located at respective positions in said third parts of said first and second guide grooves.

* * * * *